(12) United States Patent
Cohen et al.

(10) Patent No.: US 10,412,099 B2
(45) Date of Patent: Sep. 10, 2019

(54) SYSTEM SECURITY CONFIGURATIONS BASED ON ASSETS ASSOCIATED WITH ACTIVITIES

(71) Applicant: PAYPAL, INC., San Jose, CA (US)

(72) Inventors: Adam Cohen, Ramat Gan (IL); David Stein, Even Yehuda (IL); Itzik Levi, Tel-Aviv Yafo (IL)

(73) Assignee: PayPal, Inc., San Jose, CA (US)

( * ) Notice: Subject to any disclaimer, the term of this patent is extended or adjusted under 35 U.S.C. 154(b) by 98 days.

(21) Appl. No.: 15/189,500

(22) Filed: Jun. 22, 2016

(65) Prior Publication Data

US 2017/0374083 A1    Dec. 28, 2017

(51) Int. Cl.
*H04L 29/06* (2006.01)
*G06N 7/00* (2006.01)

(52) U.S. Cl.
CPC ......... *H04L 63/1416* (2013.01); *G06N 7/005* (2013.01)

(58) Field of Classification Search
CPC .............................. H04L 63/1416; G06N 7/005
See application file for complete search history.

(56) References Cited

U.S. PATENT DOCUMENTS

| | | | | |
|---|---|---|---|---|
| 8,856,923 B1 * | 10/2014 | Kolman | ............ | G06Q 20/4016 380/255 |
| 9,367,872 B1 * | 6/2016 | Visbal | .................... | G06Q 40/00 |
| 10,003,466 B1 * | 6/2018 | Miller | ................... | H04L 9/3247 |
| 2007/0106582 A1 * | 5/2007 | Baker | ................. | G06Q 10/067 705/35 |
| 2007/0112512 A1 * | 5/2007 | McConnell | ........... | G06F 21/577 701/469 |
| 2009/0138592 A1 * | 5/2009 | Overcash | ............ | H04L 63/1425 709/224 |
| 2010/0100693 A1 * | 4/2010 | Kerley | .................. | G06Q 10/10 711/154 |
| 2010/0269175 A1 * | 10/2010 | Stolfo | ..................... | G06F 21/55 726/22 |
| 2011/0099628 A1 * | 4/2011 | Lanxner | ................. | G06Q 40/00 726/22 |
| 2013/0185191 A1 * | 7/2013 | Ganor | .................... | G06Q 30/06 705/39 |
| 2014/0122343 A1 * | 5/2014 | Einav | ................. | G06Q 20/4016 705/67 |
| 2014/0181968 A1 * | 6/2014 | Ge | ...................... | H04L 63/1416 726/23 |

(Continued)

*Primary Examiner* — Carl G Colin
*Assistant Examiner* — Vance M Little
(74) *Attorney, Agent, or Firm* — Haynes and Boone LLP

(57) ABSTRACT

Various systems, mediums, and methods may involve a data engine with various components. For example, a system with the data engine may include a segmentation component, an asset preparation component, a clustering component, a variable generation component, and classification component. As such, the system may determine a number of assets associated with a number of activities of one or more accounts. Further, the system may determine various links associated with the number of assets. As such, the system may detect an attack and/or an attack trend associated with the one or more accounts based on the various links associated with the number assets. Further, the system may generate a notification that indicates the attack and/or the attack trend detected.

22 Claims, 10 Drawing Sheets

(56) References Cited

U.S. PATENT DOCUMENTS

2014/0380475 A1* 12/2014 Canning ............. H04L 63/1408
726/23
2015/0073987 A1* 3/2015 Dutt ................... G06Q 20/4016
705/44

* cited by examiner

SYSTEM SECURITY CONFIGURATIONS BASED ON ASSETS ASSOCIATED WITH ACTIVITIES

BACKGROUND

Various types of fraud may involve more than one fraudulent action. For example, scalable fraud may involve multiple fraudulent actions by one or more persons, possibly initiated by a group of persons. In some instances, scalable fraud may involve sophisticated fraudsters, such as professional fraudsters with much knowledge of the targeted systems. These fraudsters may spend significant amounts of time and resources to plan their attacks on the targeted systems. Further, these fraudsters may know how to avoid various types of fraud detection mechanisms, particularly by evading or circumventing the mechanisms through the use of technology. In some instances, such fraudsters may also utilize such technologies to hide their "tracks" so as to deploy their actions without being detected. Under various such circumstances, scalable fraud may involve technologies that deploy various types of actions that are repeatable time and time again.

In some instances, scalable fraud may not be monetized immediately. In some instances, scalable fraud may be monetized over periods of time, possibly longer periods of time, ranging from a number months to possibly a number of years. As such, scalable fraud may involve deploying various types of actions or schemes over such periods of time without being detected. Further, scalable fraud may not be monetized directly by the fraudster deploying such actions. For example, there may be a number of intermediate entities involved such that the fraudsters deploying the actions remain unrecognized and undetected.

Scalable frauds may damage the targeted systems that extend beyond financial losses. For example, scalable fraud may create a large number of anomalies in the system data, possibly making the data unreliable. As such, various entities authorized to access the data may face difficulties in researching and analyzing the data, possibly based on various uncertainties associated with the integrity of the data being compromised from the scalable fraud. As described, there is much need for technological improvements in various aspects of computer technology in the realm of computer networks and particularly with systems with susceptibilities to various forms of fraud.

Figure 1:
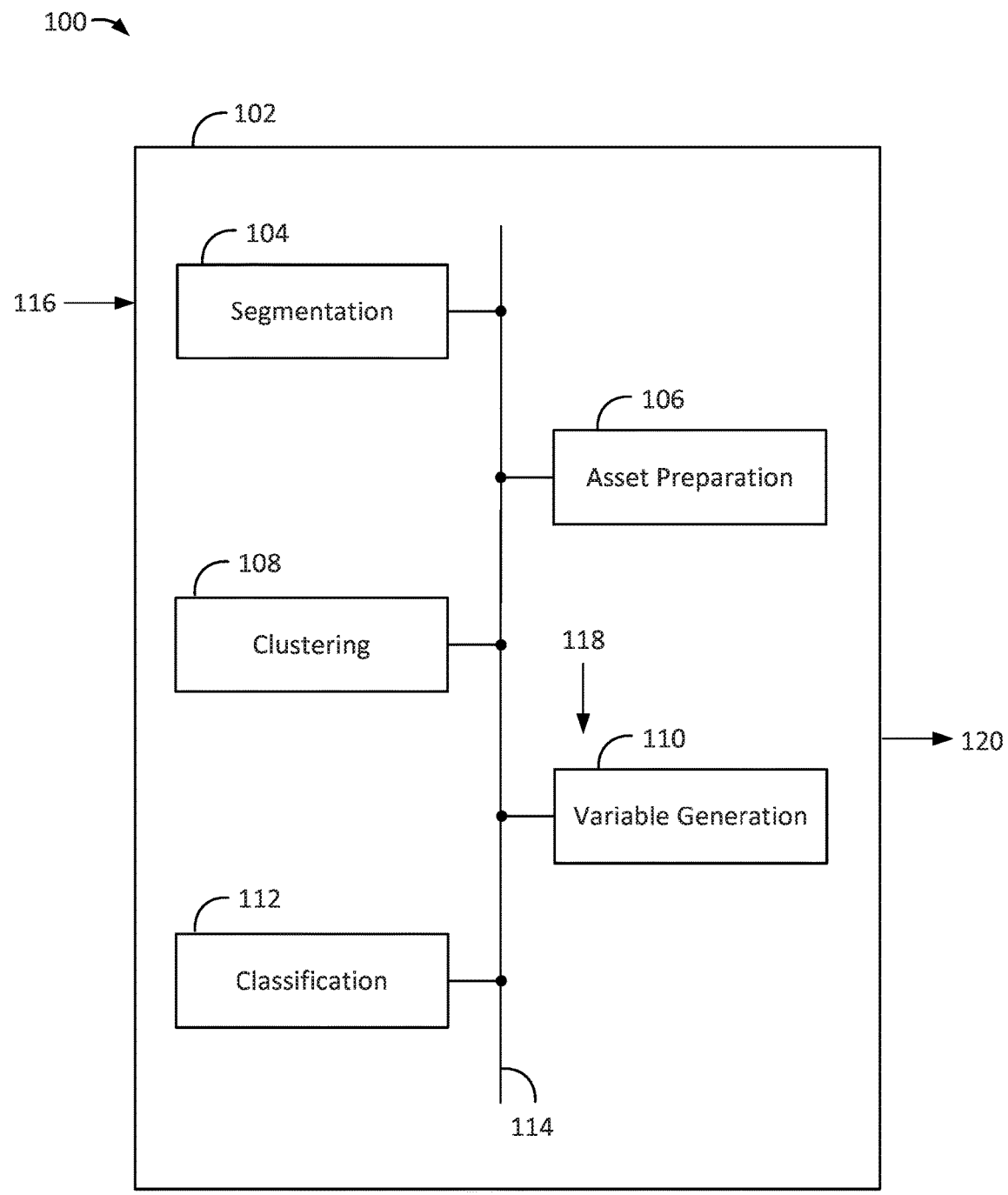
FIG. 1 is a simplified block diagram of an exemplary system, according to an embodiment.

Embodiments of the present disclosure and their advantages may be understood by referring to the detailed description herein. It should be appreciated that reference numerals may be used to illustrate various elements and features provided in the figures. The figures may illustrate various examples for purposes of illustration and explanation related to the embodiments of the present disclosure and not for purposes of any limitation.

DETAILED DESCRIPTION

As described above, there is much need for technological improvements in various aspects of computer technology in the realm of computer networks and particularly with systems susceptible to various forms of fraudulent actions, such as the scalable fraud described above. For example, consider the scenarios above such that there are a number of sophisticated fraudsters that spend a significant amount of time and resources to plan an attack on a targeted system. In such instances, the systems described herein may be configured to detect such attacks.

In some embodiments, the systems described herein may involve assets, such as hard assets, soft assets, and/or behavioral assets. In some instances, the assets may link various activities, including user activities associated with an account. Further, the assets may link other activities, such as fraudulent activities associated with an attack. For example, the assets may link various attempts in the attack, such as attempts to access data from one or more user accounts. As such, the attack may be identified based on one or more assets. For instances, hard assets may include website data stored in browsers of user devices authorized to access the user accounts. Further, hard assets may include data that indicates the identifier of the user device, such as a device ID that corresponds to the manufacturer of the device. As such, the fraudsters may retrieve the website data stored to access data associated with the user accounts. Yet, in some instances, the fraudsters may take actions to cover their tracks by deleting the website data from the browsers so as to deploy the attack without being detected. Under such circumstances, the system described herein may be configured to detect the actions intended to cover the fraudster's tracks.

In some embodiments, the systems described herein may detect attacks based on a number of other types of assets. In some instances, the systems may determine soft assets. For example, soft assets may include location data that links various locations of activities associated with the user accounts. In further examples, soft assets may include data that indicates the device and/or the device type, such as a smartphone and/or a personal computer, possibly also indications of processors types, memory types (e.g., installed memory or RAM), among other possibilities. Further, soft assets may also include data that indicates the web browser or web browser type, such as shell-based browsers built around one or more engines. Yet further, soft assets may also include data that indicates the type of connection, such as the internet service provider (ISP), the corporate networks (CORP), virtual private networks (VPN), and/or various proxies, among other possibilities.

In some embodiments, the soft assets may be weaker links associated with user accounts, possibly compared to the hard assets described above. Yet, the systems may detect a number of asset links associated with the soft assets, possibly between each of the soft assets. As such, the number of asset links associated with the soft assets may be used to identify an attack, possibly identifying one or more trends of the attack referred to herein as attack trends. For example, one or more attack trends may include repeatable actions associated with the attack, patterns of such repeatable actions, and/or timing characteristics of such repeatable actions, among other characteristics related to the attack.

Consider the scenarios described above where the fraudsters attempt to cover their tracks by deleting data retrieved from various browsers. Further, consider the examples above involving soft assets. In such instances, the fraudsters may be less likely to cover their tracks associated with the soft assets. In particular, the systems described above may monitor a number of assets, particularly including numerous soft assets. Yet further, the systems may monitor multiple asset links between the soft assets, thereby making it difficult for the fraudsters to cover their tracks based on the number of soft assets and asset links monitored. In particular, the increase in the number of soft assets monitored may increase the probability of the fraudster making a mistake, such as leaving one or more tracks uncovered. In some instances, the mistake may increase risks associated with exposing the fraudster's activities associated with the attack.

In some embodiments, an asset may be assigned a weight. In some instances, the weight may indicate a probability that the asset is associated with one or more types of activities, possibly fraudulent activities. For example, an asset with a higher weight may have a lower probability to appear, such as in one or more networks. Further, the higher weight may indicate a true linkage between corresponding activities. In another example, an asset with a lower weight may have a higher probability that the asset is associated with one or more activities, such as the one or more fraudulent activities described above. Thus, the lower weight may indicate a false linkage between one or more activities. In some instances, the weight associated with an asset may be compared with a threshold weight to determine a true linkage or a false linkage.

In some embodiments, one or more behaviors of the assets may also be determined, possibly over one or more time periods. For example, one or more assets may be identified frequently over the one or more time periods. In such instances, these assets may be referred to as behavioral assets. In some instances, behavioral assets may include data associated with user behavior, such as a user's writing, typing, and/or clicking patterns, among other possible activities of the user associated with computing devices. Further behavioral assets may also include data that indicates consistencies between data elements such as internet protocol (IP) addresses, residential addresses, billing addresses, credit card information, and/or email domains, among other possible aspects related to the user. In some instances, a credit card from the U.S. may be associated with a Russian IP address, possibly indicating a pattern and/or links with one or more accounts.

Further, asset probabilities may be determined or distributed over the one or more time periods. In some instances, an asset may become more frequent in a certain time period, thereby increasing the probability that the asset is associated with an attack that may be scaled with a number of accounts referred to herein as a scalable attack. For example, consider a scenario such that an account is created each month in the city of Santa Cruz, Calif. In such instances, the systems may determine normal activities associated with the accounts created based on the size of the city, e.g., the population of the city. Yet, consider another scenario such that one thousand accounts are created in a given month, possibly where the average number of accounts created in a month is one or two accounts. In such instances, the one thousand accounts created in the given month may be an asset, e.g., a behavioral asset, indicative of activities associated with a potential attack.

In another example, consider a scenario where a new operating system of a smartphone is detected. For example, the operating system may be detected in a given instant, where the operating system did not have any appearances up until its detection point in time. Further, consider that numerous activities from the operating system are identified following the initial detection point in time. In such instances, the systems will assign an asset associated with the activities with a lower weight. Yet further, the lower weight associated with the asset may be indicative of an attack.

In some embodiments, the assets may be segmented. For example, data populations may be segmented to build and/or cluster the assets. In some instances, the assets may be segmented based on the windows in time (i.e., temporal windows), including various time periods associated with activities of the accounts. For example, the time periods may be based on the past week of activity associated with a given account, the last month of activity associated with the account (e.g., January 15 to February 15), and/or the last few months of activity associated with the account, among other possibilities. Further, the assets may be segmented based on such time periods and irrelevant keys may be filtered accordingly. In some instances, the irrelevant keys may be selected by the system based on one or more user inputs. By clustering based on the time periods and avoiding the larger data populations by filtering out irrelevant keys, more accurate results may be obtained. Yet, notably, the results may depend on the selections of the time periods based on the data populations and appropriately filtering the keys.

In some embodiments, the assets may be prepared. In particular, the systems may create hard assets, soft assets, and/or behavior assets, among other types of assets, possibly based on the number of assets. In some instances, the system may run a process for each asset, where each asset may be specified by a key or key type. Further, each key type may correspond with accounts, sessions, and/or transactions, among other types of possible assets. Further, the system may create the assets with respective weights, possibly related to each cluster and the temporal behavior associated with each cluster.

In some embodiments, the assets may be clustered. In some instances, assets with the same keys or similar keys may be clustered. Further, the clusters may operate as anomaly detection mechanisms. In particular, the clusters may identify irregularities and low probabilities of activities, including user activities, authorized activities, and/or fraudulent activities. Yet further, density-based algorithms may be utilized, possibly to cluster the assets. In some instances, the clustering stage considers the weights of the assets and the weights may be tuned to consider the number of matching assets and the respective weights of those assets. In some instances, the clustering may allow fuzzy matching, such that similar assets, possibly including those that may not be identical assets, may be considered with different weights.

In some embodiments, variables may be generated. In particular, one or more variables may be generated for each cluster. For example, one variable for a given cluster may correspond to a family of data that indicates an architecture of the cluster, an average weight of the assets in the cluster, the type of assets in the cluster, and/or the asset consistency associated with the cluster. Further, the cluster data may indicate additional assets and/or asset links, potentially absent and/or removed from one or more clustering stages. Yet, these additional assets and/or asset links in the cluster may indicate connections between accounts, such as a number of transactions of the accounts. In some instances, the data may also indicate a risk indicator or a status indicator (e.g., a good indication or a bad indication), possibly per each asset key. For example, the indicators may provide a risk indicator or a status indicator for a given account, among a number of other accounts. In some instances, the risk indicator may be further expanded to the cluster, specifically based on one or more activities in the cluster that may be tagged with a status, such as good or bad. As such, the risk indicator can reflect this tag on the cluster.

In some embodiments, clusters may be classified. In some embodiments, various classification and algorithmic systems may be utilized to classify the clusters. For example, support vector networks (SVNs), support vector machines (SVMs), and/or neural networks, among other types of machine learning systems may be utilized to determine the classification or the status of a cluster, possibly indicating a cluster is good or bad. In some instances, multiple approaches to the classification may be performed. For example, one approach may involve classifying the given cluster based on a tag created for the cluster. In some instances, another approach may involve training the cluster to model and/or predict the cluster is good or bad.

In some instances, each point in a cluster may be tagged. For example, a number of activities of an account may be tagged. Yet further, each key may be tagged. In some instances, data associated with each tagged key may be trained separately. In such instances, the classifications may "break" or separate areas of the cluster. Further, in such instances, additional variables can be created per key, among other possibilities.

FIG. 1A is a simplified block diagram of an exemplary system 100, according to an embodiment. As shown, the system 100 includes a data engine 102. Further, the data engine 102 includes a segmentation component 104, an asset preparation component 106, a clustering component 108, a variable generation component 110, and classification component 112. In some embodiments, one or more of the components 104-112 may take the form of hardware components, such as a processor, an application specific integrated circuit (ASIC), a programmable system-on-chip (SOC), a field-programmable gate array (FPGA), and/or programmable logic devices (PLDs), among other possibilities. As shown, the components 104-112 may be coupled to a bus, network, or other connection 114. Yet, it should be noted that any two or more of the components 104-112 may be combined to take the form of a single hardware component, such as the programmable SOC.

In some embodiments, the segmentation component 104 may segment a number of assets and/or data populations 116, as described herein. For example, the segmentation component 104 may segment the assets 116 based on various time periods, including the past week of activity associated with a given account, the last month of activity associated with the account, and/or the last few months of activity associated with the account, among other possibilities.

In some embodiments, the asset preparation component 106 may create hard assets, soft assets, and/or behavior assets, among other types of assets described above, possibly based on the number of assets. In some instances, the asset preparation component 106 may run a process for each of the segmented assets 116, where each of the assets 116 may be specified by a key type. Further, each key type may correspond with accounts, sessions, and/or transactions, among other types of possible assets. Further, the asset preparation component 106 may prepare the assets 116 with respective weights, possibly related to each cluster and the temporal behavior associated with each cluster. Notably, the key types should not be interpreted to be limited to one or more corresponding accounts. The various key types may also be used on sessions, flows, and/or entry points of defined groups of such accounts, among other possibilities.

In some embodiments, the clustering component 108 may cluster the assets 116. For example, the clustering component 108 may cluster one or more of the prepared assets 116 based on the same or similar keys associated with the assets 116. As such, in some instances, the clusters 118 may operate as anomaly detection mechanisms. In particular, the clusters 118 may identify irregularities and low probabilities of activities, including user activities, authorized activities, and/or fraudulent activities. Yet further, density-based algorithms may be utilized. In some instances, the clustering component 108 considers the weights of the assets 116 and the weights may be tuned to consider the number of matching assets and the respective weights of those assets. In some instances, the clustering may allow fuzzy matching, such that similar assets, possibly including those that may not be identical assets, may be considered with different weights.

In some embodiments, the variable generation component 110 may generate the variables, as described above. In particular, one or more variables may be generated for each of the clusters 118. For example, one variable for the given clusters 118 may include a family of data that indicates architectures of the clusters 118, average weights of the assets 116 in the clusters 118, the types of assets 116 in the clusters 118, and/or the consistencies of the assets 116 associated with the clusters 118. Further, the data may indicate additional assets and/or asset links, potentially absent from one or more clustering stages.

In some embodiments, the classification component 112 may classify the clusters 118. The classification component 112 may include support vector networks (SVNs), support vector machines (SVMs), and/or neural networks, among other types of machine learning systems to classify the clusters 118. For example, the classification component 112 may determine the classification or the status of a cluster 118, possibly indicating each of the clusters 118 is good or bad. For example, the classification component 112 may determine a classification and/or a status range, possibly from zero to one hundred, where zero indicates a bad cluster and one hundred indicates a good cluster. In some instances, multiple approaches to the classification may be performed. For example, one approach may involve classifying the cluster 118 based on a tag created for the cluster 118. In some instances, another approach may involve training the cluster 118 to model and/or predict the cluster 118 is good or bad. As such, the data engine 102 may output a number of classified clusters 120 that may indicate an attack and/or an attack trend.

Figure 2A:
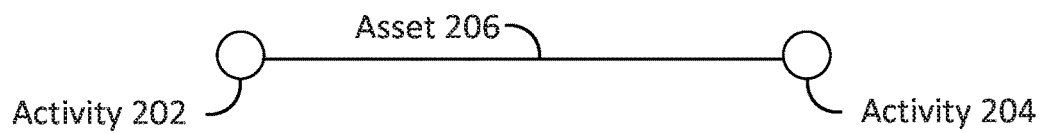
FIG. 2A illustrates an exemplary system with an asset, according to an embodiment

FIG. 2A illustrates an exemplary system 200 with an asset 206, according to an embodiment. As shown, the asset 206 may link the activities 202 and 204. The activities 202 and 204 may include activities of one or more accounts, possibly accounts associated with a provider, such as PayPal, Inc. of San Jose, Calif., USA. For example, the activities 202 and 204 may include transferring payments from the one or more accounts, such as sending or requesting payments from the accounts, using a smartphone to accept money for the accounts, adding or deducting money from the accounts, mapping bank accounts to the accounts, and/or mapping credit cards to the accounts, among other activities associated with the accounts.

In some embodiments, the asset 206 may include hard assets, soft assets, and/or behavioral assets, as described above. For example, the hard assets may include website data stored in browsers of user devices authorized to access the user accounts described herein. In particular, the website data may take the form of a web cookie, an Internet cookie, and/or a browser cookie associate with browsing various websites, such as a website hosted by the providers. In some instances, the asset 206 may include soft assets, such as location data that indicates various locations associated with the activities 202 and 204 of the user accounts. Notably, the soft assets may be weaker links associated with user accounts, possibly compared to the hard assets described above. Yet, a number of the soft assets and/or asset links associated with the soft assets may identify an attack and/or attack trends. In some instances, the asset 206 may include behavioral assets described above, possibly determined over one or more time periods. For example, one or more behavioral assets may be identified frequently or less frequently over the one or more time periods.

Figure 2B:
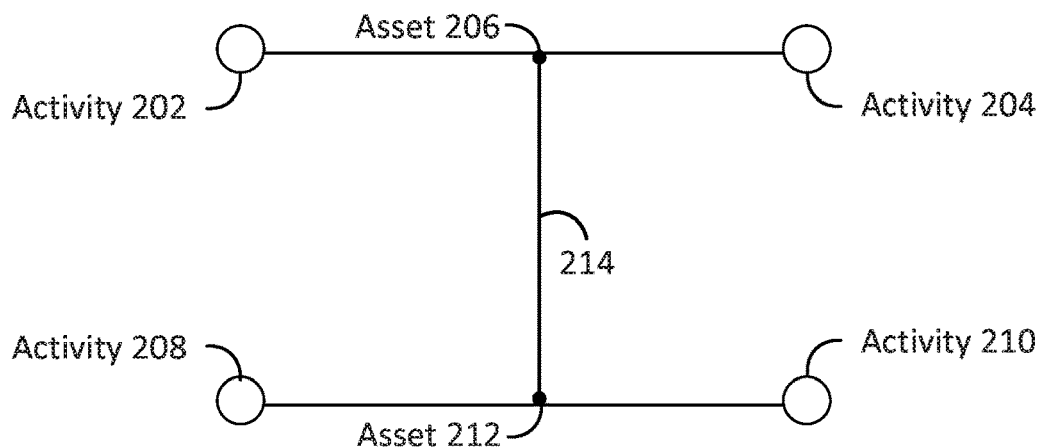
FIG. 2B illustrates an exemplary system with an asset link, according to an embodiment.

FIG. 2B illustrates an exemplary system 200 with an asset link 214, according to an embodiment. As shown, the system 200 includes the activities 202 and 204, and the asset 206 described above. Further, the system 200 includes the activities 208 and 210 that may be similar to the one or more of the activities 202 and 204. Yet, the activities 208 and 210 may occur at different times than the activities 202 and 204. Yet further, the system 200 includes the asset link 214. As shown, the asset link 214 may link the asset 206 and the asset 212. For example, in one scenario, the assets 206 and 208 may be soft assets that provide weak links or evidence between the user activities 202 and 204, and the user activities 208 and 210, respectively. Yet, the asset link 214 may support the assets 206 and 208 to facilitate identifying an attack and/or an attack trend.

In some embodiments, the system 200 may include the data engine 102 described above in relation to FIG. 1. As such, the system 200, possibly with the data engine 102, may perform operations including determining the first asset 206 of a network is associated with a first number of activities 202 and 204 of one or more accounts. Further, the system 200 may determine a second asset 212 of the network is associated with a second number of activities 208 and 210 of the one or more accounts. Yet further, the system 200 may determine one or more links 214 associated with the first asset 206 and the second asset 212. In addition, the system 200 may detect an attack trend associated with the one or more accounts based on the one or more links 214 with the first asset 206 and the second asset 212. As such, the system 200 may generate a notification that indicates the attack trend is detected, possibly to transmit the notification to a client device configured to display the notification. It should be noted that the terms, "first," "second," and/or "third," should not be interpreted as any order or sequence associated with the assets. In particular, these terms may be used to simply distinguish between the different assets for purposes of examples and illustrations.

In some embodiments, consider a scenario where the first asset 206 is a hard asset 206, possibly comprising website data stored in a browser of a user device with access to the one or more accounts, as described above. For example, the website data may be stored from a provider website that transfers funds with the one or more user accounts based on the user activities 202 and/or 204. Further, consider the second asset 212 may be a soft asset 212 that indicates an internet protocol (IP) address associated with the user device. For example, the IP address may be associated with further transfers of funds with the one or more accounts based on the user activities 208 and/or 210. In some instances, the system 200 may determine the one or more links 214 is associated with the website data and the IP address. For instance, the user device with the IP address may store the website data in a browser that hosts the provider website. In such instances, the attack trend may be detected based on the one or more links 214 associated with website data and the IP address, possibly where the attack trend involves the website data and/or the IP address. For example, the attack trend may involve an unauthorized user gaining access to the one or more user accounts based on the website data and/or the IP address.

In some embodiments, consider another scenario where the first asset 206 is a first soft asset 206 that indicates an address associated with the first number of activities 202 and/or 204 of the one or more accounts. For example, the address may include a billing address, a shipping address, and/or a merchant address, among other types of addresses associated with the activities 202 and/or 204 of the one or more accounts, possibly including a first transaction associated with the address. Further, consider the second asset 212 is a second soft asset 212 that indicates a GPS location associated with the second number of activities 208 and/or 210, possibly including a second transaction associated with the GPS location. In some instances, the system 200 may determine the one or more links 214 is associated with the address described above and the GPS location. For example, the address may correspond to a geographic area that includes and/or overlaps with the GPS location. As such, the attack trend may be detected based on the one or more links 214 associated with the address and the GPS location. For example, in one scenario, the address itself may be insufficient to detect the attack trend. Yet, the one or more links 214 with the address of the asset 206 and the GPS location of the asset 212 may be sufficient to detect the attack trend. Notably, multiple other assets may be implemented with the first soft asset 206 and the second soft asset 212. For example, the first soft asset 206 and/or the second soft asset 212 may correspond with multiple other assets, where each asset indicates the state, the county, the zip code, the area code, the city, and/or multiple boundary related lines, among other forms of data associated with the addresses described above.

Figure 2C:
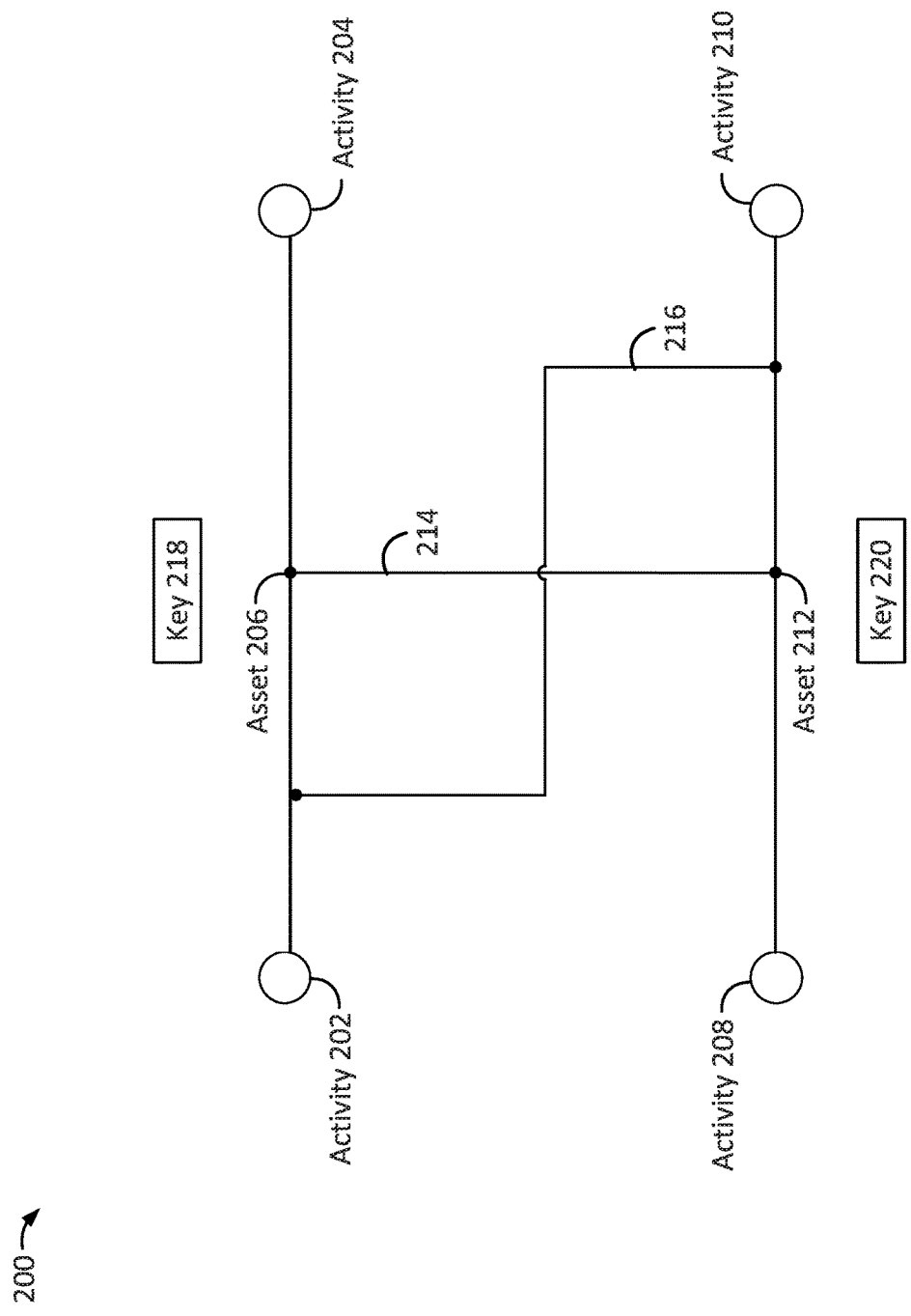
FIG. 2C illustrates an exemplary system with a number of asset links, according to an embodiment.

FIG. 2C illustrates an exemplary system 200 with a number of asset links 214 and 216, according to an embodiment. As shown, the system 200 may include the activities 202, 204, 208, and 210, the assets 206 and 212, and the asset link 214, described above in relation to FIGS. 2A and 2B. Yet, consider the scenarios above where the first asset 206 is a first soft asset 206 that indicates the address associated with the first number of activities 202 and/or 204 of the one or more accounts. Notably, the soft asset 206 may be a weaker link associated with the first number of activities 202 and/or 204, as opposed to a hard asset, for example. Yet, the system 200 may also detect a number of asset links 214 and/or 216 between the soft assets 206 and 212. Further, the soft asset 212 may be a link associated with the second number of activities 208 and 210, possibly similar to the soft asset 206 described above to be a weaker link. As such, the assets 206 and 212, and the number of asset links 214 and 216 associated with the soft assets 206 and 212, may be used to identify an attack, possibly identifying one or more attack trends. Notably, the activities 202, 204, 208, and 210, the assets 206 and 212, and the asset links 214 and 216, may also be referred to as a network 200.

As described above, fraudsters may be less likely to cover their tracks. Referring to FIG. 2C, the fraudsters may be less likely to cover tracks associated with the soft assets 206 and/or 212. As such, the system 200 may monitor a number of the soft assets 206 and/or 212. Further, the system 200 may monitor multiple asset links 214 and/or 216 between the soft assets 206 and 212, thereby making it difficult for the fraudsters to cover their tracks (e.g. hide where they have been or what they have done) based on the numerous soft assets 206 and/or 212, and/or asset links 214 and/or 216 monitored. In particular, the increase in the number of soft assets 206 and 212 monitored may increase the probability of the fraudsters making a mistake, such as leaving one or more tracks uncovered. In some instances, the mistake may increase risks associated with exposing one or more of the fraudster's activities associated with the attack, possibly associated with one or more of the activities 202, 204, 208, and/or 210.

In some embodiments, consider a scenario where the first asset 206 is a first behavioral asset 206 that links the first number of activities 202 and/or 204 of the one or more accounts over a time period. Further, consider the second asset 212 is a second behavioral asset 212 that links the second number of activities 208 and/or 210 of the one or more accounts over the time period. In particular, the first behavioral asset 206 and the second behavioral asset 212 may be frequently identified over the time period, possibly indicating respective probabilities associated with each of the first behavioral asset 206 and the second behavioral asset 212 possibly involving an attack and/or an attack trend. As such, the attack and/or the attack trend may be detected based on the first behavioral asset 206 and the second behavioral asset 212 identified in the time period, possibly based on the number of times the first behavioral asset 206 and the second behavioral asset 212 are identified in the time period. In some instances, the system 200 may detect one or more repeatable actions or patterns associated with the one or more accounts based on the first behavioral asset 206 and the second behavioral asset 212. As such, the attack trend may be detected based at least on the one or more repeatable actions detected.

In some embodiments, the system 200 may run one or more processes with the first asset 206 and the second asset 212 based on a number of keys. For example, the system 200 may determine a first key 218 for the first asset 206, possibly corresponding to the first number of activities 202 and 204 of the one or more accounts. Further, the system 200 may determine a second key 220 for the second asset 212, possibly corresponding to the second number of activities 208 and 210 of the one or more accounts. As such, the system 200 may cluster the first asset 206 with the second asset 212 based on the first key 218 and the second key 220. For example, the first key 218 and the second key 220 may indicate the asset links 214 and/or 216 configured to link and/or cluster the assets 206 and 212.

In some embodiments, the system 200 may determine a first weight for the first asset 206. In particular, the first weight may indicate a true linkage between the activities 202 and/or 204, possibly indicating the authenticity and/or the predicted authenticity of the activities 202 and/or 204. As such, the first weight may correspond to a first probability that the first number of activities 202 and/or 204 includes one or more fraudulent activities. In some instances, the system 200 may determine a second weight for the second asset 212. In particular, the second weight may indicate the authenticity and/or the predicted authenticities of the activities 202 and/or 204. As such, the second weight may correspond to a second probability that the second number of activities 208 and/or 210 includes the one or more fraudulent activities. In some instances, the attack trend may be detected based at least on the first probability and the second probability.

Figure 3A:
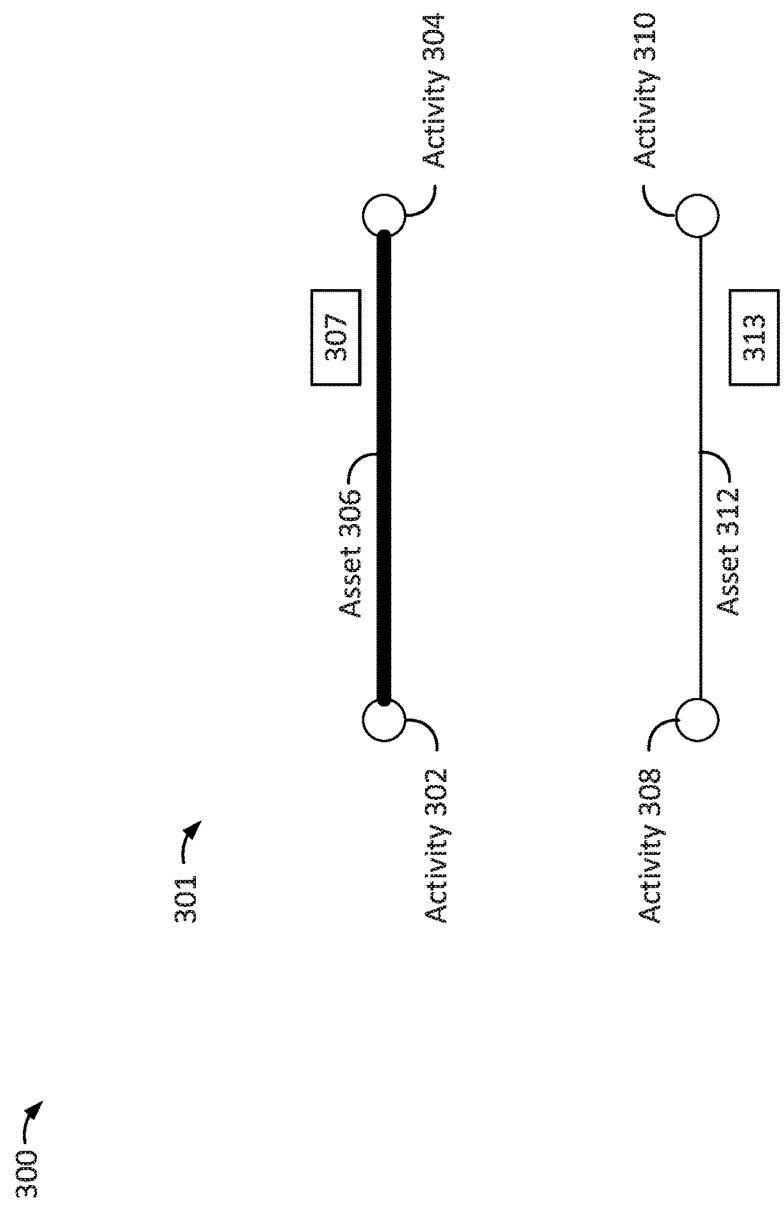
FIG. 3A illustrates an exemplary system with a number of assets with respective weights, according to an embodiment.

FIG. 3A illustrates an exemplary system 300 with a number of assets 306 and 312 with respective weights 307 and 313, according to an embodiment. As shown, the system 300 includes a cluster 301 with the assets 306 and 312 that may take the form of the assets 206 and 212, respectively. Further, the system 300 includes the activities 302, 304, 308, and/or 310 that may be the activities 202, 204, 208, and/or 210, respectively, or possibly similar to the activities 202, 204, 208, and/or 210, respectively. As such, the asset 306 may link the activities 302 and 304, and further, the asset 312 may link the activities 308 and 310. Yet, as shown, the asset 306 may correspond with a respective weight 307, possibly illustrated by the thickness of the asset 306. Further, the asset 312 may correspond with a respective weight 313, possibly illustrated by the thickness of the asset 312. Considering the scenarios above, the weight 307 may indicate the linkage and/or the predicted authenticity between the activities 302 and/or 304, whereas the weight 313 may indicate the linkage and/or the predicted authenticity between the activities 308 and/or 310. As shown, the weight 307 may be greater than the weight 313, possibly indicative of the activities 302 and/or 304 having a true linkage and/or a higher predicted authenticity than the activities 308 and/or 310.

In some embodiments, the system 300 may include a non-transitory machine-readable medium having stored thereon machine-readable instructions executable to cause a machine, such as the data engine 102 described above, to perform operations. In some instances, the system 300, possibly with the data engine 102, may determine a first asset 306 of the cluster 301 associated with a first number of activities 302 and 304 of the one or more accounts. Further, the operations may include determining a second asset 312 of the cluster 300 associated with a second number of activities 308 and 310 of the one or more accounts. Yet further, the operations may include determining weights 307 and 313 for each of the first asset 306 and the second asset 312, respectively. In addition, the operations may include predicting a scalable attack associated with the one or more accounts based on the respective weights 307 and 313 determined. Further, the operations may include generating a notification that indicates the scalable attack detected, where the notification may be transmitted to one or more user devices configured to display the notification, such as a smartphone device and/or a personal computing device.

In some embodiments, the system 300 may detect one or more tracks of the scalable attack predicted. In some instances, the one or more tracks detected may be associated with the first number of activities 302 and/or 304. Further, the one or more tracks detected may be associated with the second number of activities 308 and/or 310. For example, the tracks detected may include the website data and/or the Internet cookies described above, possibly accessed by a fraudster based on an open browser of the user device with access to the one or more accounts. As such, the system 300 may detect an action associated with the scalable attack to cover the one or more tracks detected. In particular, based on the example above, the action detected may be a fraudster action to delete the website data and/or the Internet cookies generated, possibly based on the fraudster covering tracks associated with accessing the one or more accounts. Thus, a notification may be generated to further indicate the cover actions detected.

Figure 3B:
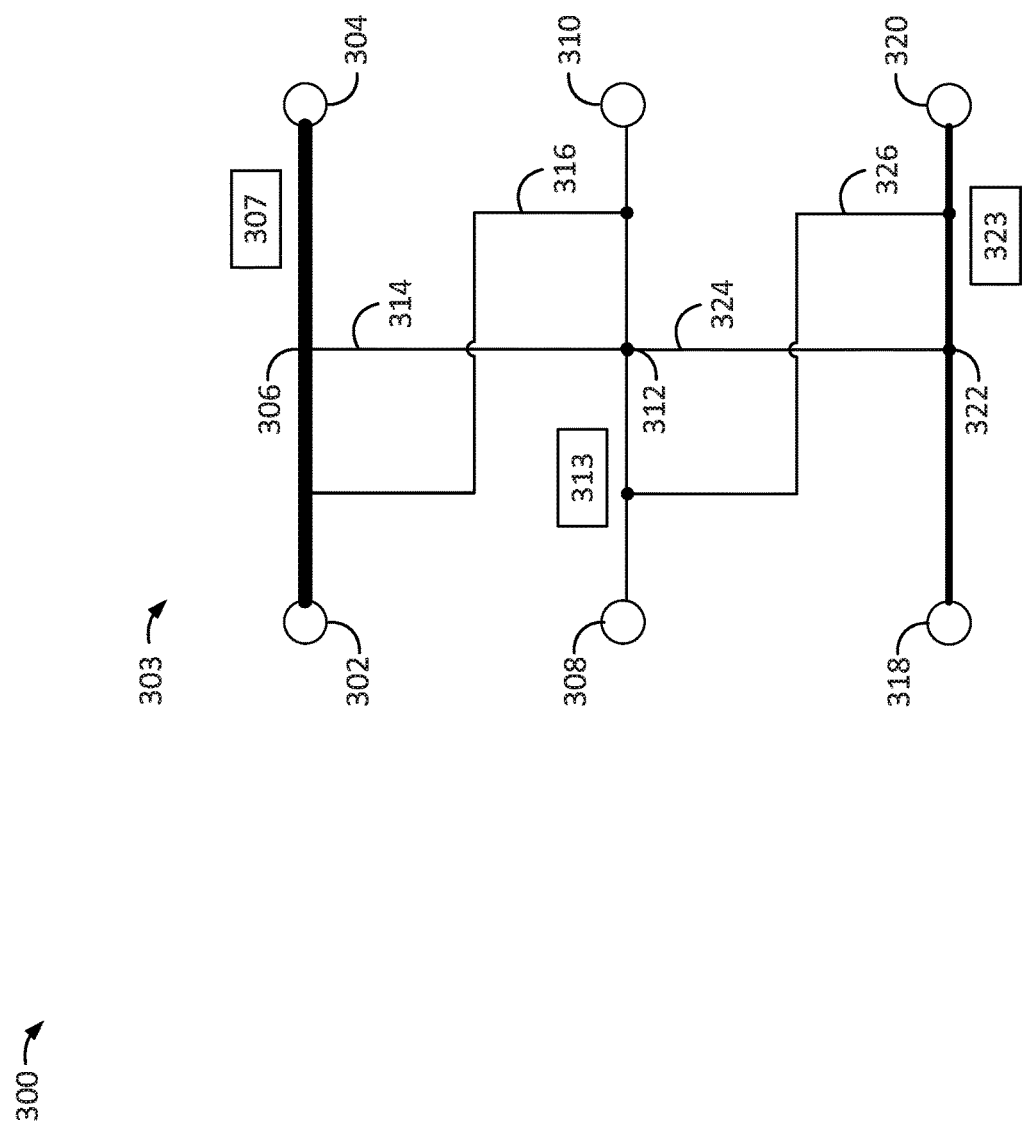
FIG. 3B illustrates an exemplary system with a number of assets with respective weights, according to an embodiment.

FIG. 3B illustrates an exemplary system 300 with a number of assets 306, 312, and/or 322 with respective weights 307, 313, and 323, according to an embodiment. As shown, the system 300 may include the cluster 301 described above. Further, the system 300 may include a cluster 303 with the assets 306 and/or 312 described above in relation to FIG. 3A, and also the asset 322. Further, the system 300 includes the activities 302, 304, 308, 310, 318, and/or 320. As such, the asset 306 may link the activities 302 and 304, the asset 312 may link the activities 308 and 310, and the asset 322 may link the activities 318 and 320. In some instances, the assets 306, 312, and 322 may take the form of the hard assets, soft assets, and/or behavioral assets described above. Yet, in some instances, the assets 306, 312, and 322 may each take the form of the soft assets described above, such as the soft assets 206 and/or 212 described in the examples above. In such instances, the asset links 314 and 316 may be associated with the assets 306 and 312, and further, the asset links 324 and 326 may be associated with the assets 312 and 322, possibly to detect attacks and/or attack trends.

In some embodiments, as shown, the asset 306 may correspond with a respective weight 307, the asset 312 may correspond with a respective weight 313, and the asset 322 may correspond with a respective 323, as illustrated by the thickness of the assets 306, 312, and/or 322. As shown, the weight 307 may be higher than the weight 323, and the weight 323 may be higher than the weight 313. In some instances, the weight 307 may be higher than the weight 323, possibly indicating a true linkage and/or a higher predicted authenticity of the asset 306 than the asset 322. Further, in some instances, the weight 323 may be higher than the weight 313, possibly indicating a true linkage and/or a higher predicted authenticity of the asset 322 than the asset 312. Yet further, in some instances, the weight 313 of the asset 312 and/or the activities 308 and/or 310 may indicate a potential attack, such as one of the scalable fraud attacks described herein. For example, the weight 313 may be the lowest weight compared to the other weights 307 and 323, possibly lower by a threshold margin and/or a threshold weight that may be indicative of the attack.

In some embodiments, the system 300 may determine a probability that the activities 302 and/or 304 include a fraudulent activity. In some instances, the system 300 may determine one or more probabilities that the first number of activities 302 and/or 304 and the second number of activities 308 and/or 310 include one or more fraudulent activities. For example, considering the scenarios above where one thousand accounts are created in a given location, the system 300 may determine a higher probability that the activities 302, 304, 308, and/or 310 include one or more fraudulent activities. Notably, the system 300 may determine such probabilities based on various other circumstances, such as the detection of the one or more tracks of a predicted attack and/or actions to cover such tracks, as described above.

As such, in some instances, the system 300 may tune the respective weights 307 and 313 for the first asset 306 and the second asset 312 based on the one or more probabilities, possibly increasing the weight 307 and decreasing the weight 313. As such, the scalable attack may be predicted based on the respective weights 307 and 313 determined for the first asset 306 and the second asset 312. Notably, the system 300 may also determine the probabilities based on the third number of activities 318 and 320, potentially including a fraudulent activity, thereby also tuning the respective weight 323 of the third asset 322 in addition to the respective weights 307 and 313. Thus, the scalable attack may also be predicted based on the tuned weights 307, 313, and 313.

In some embodiments, the system 300 may predict scalable attacks based on comparisons with the respective weights 307, 313, and/or 323 of the assets 306, 312, and/or 322. As noted, the respective weight 307 of the first asset 306 may be greater than the respective weight 313 of the second asset 312, possibly based on comparing the weights 307 and 313. Further, in some instances, the respective weight 307 may be greater than the weight 313 by a threshold weight maintained by the system 300. As such, the scalable attack may be predicted to be associated with the second asset 312 and/or the number of second activities 308 and/or 310 based on the respective weight 307 of the first asset 306 that is greater than the respective weight 313 of the second asset 312.

Figure 3C:
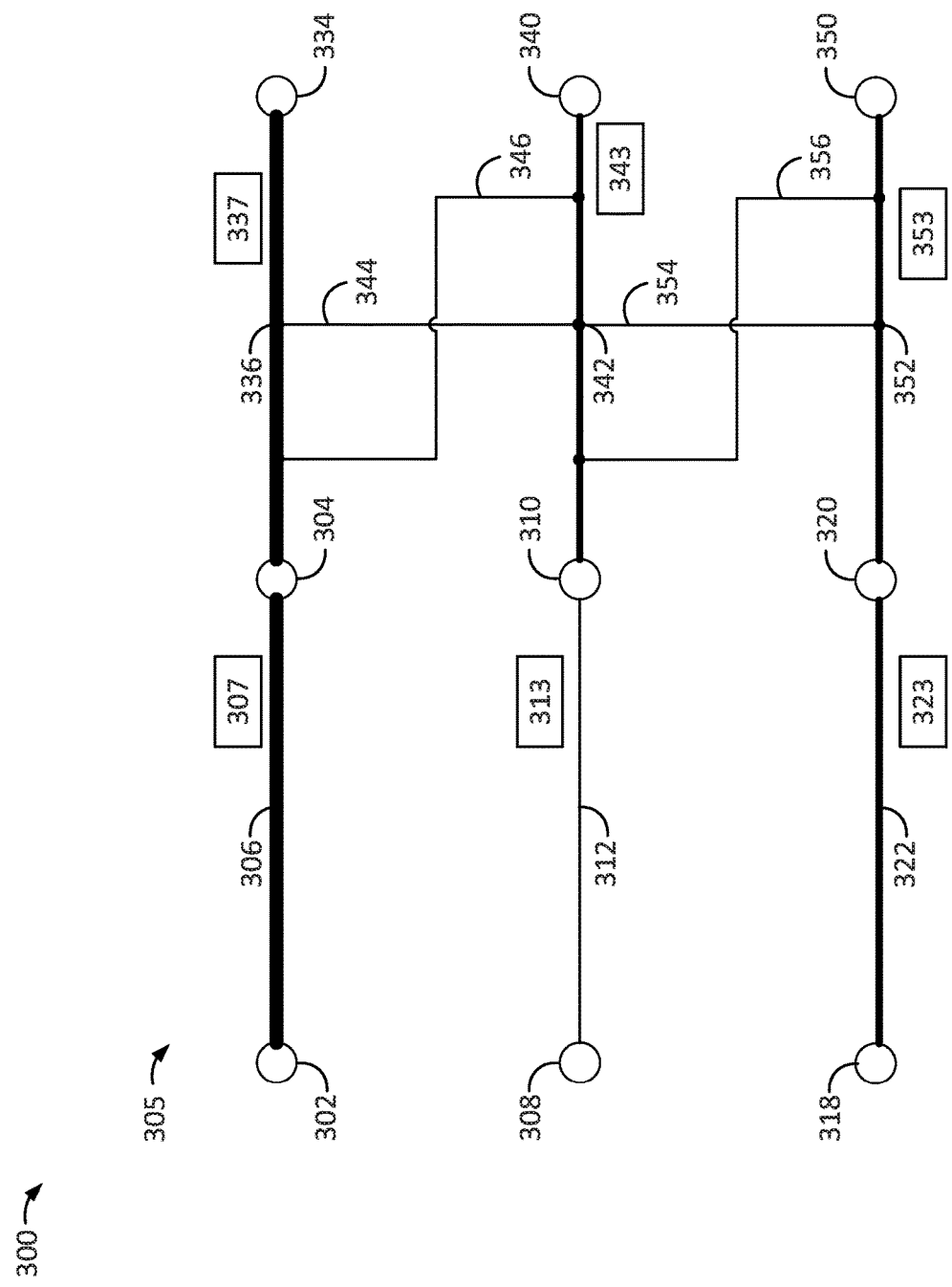
FIG. 3C illustrates an exemplary system with a number of assets with respective weights, according to an embodiment.

FIG. 3C illustrates an exemplary system 300 with a number of assets 306, 312, 322, 336, 342, and/or 352 with respective weights 307, 313, 323, 337, 343, and 353, according to an embodiment. As shown, the system 300 may include aspects of the cluster 303 described above in relation to FIG. 3B, such as the assets 306, 312, and 322. Further, the system 300 includes a cluster 305, also shown with the assets 336, 342, and/or 352 that may take the form of the hard assets, soft assets, and/or behavioral assets, as described above. Yet, in some instances, the assets 306, 312, 322, 336, 342, and/or 352 may each take the form of the soft assets described above, such as the soft assets 206 and/or 212 described in the examples above. In such instances, the asset links 344 and 346 may be associated with the assets 336 and 342. Further, the asset links 354 and 356 may be associated with the assets 342 and 352. Notably, the cluster 305 is shown without the asset links 314, 316, 324, and/or 326 described above, possibly where the system 300 removes the asset links 314, 316, 324, and/or 326, possibly based the assets 306, 312, and/or 322, and/or changes to the assets 306, 312, and/or 322.

In some embodiments, the system 300 may determine a probability distribution associated with the assets 306, 312, 322, 336, 342, and/or 352. For example, in some instances, the system 300 may determine a respective frequency associated with the first asset 306 and the second asset 312. In some instances, the respective frequencies may be determined and/or compared with average frequency associated with the assets 306, 312, 322, 336, 342, and/or 352. Further, the respective frequencies may be determined over one or more time periods described above, such as the last month of activities 302, 304, 308, and/or 310 associated with the account, e.g., January 15 to February 15. For example, the frequency of the asset 312 may meet or exceed the average frequency and/or a threshold frequency. In such instances, the scalable attack may be predicted based on the respective frequencies of the asset 312 determined, possibly where the frequency meets or exceeds the average frequency and/or a threshold frequency.

In some embodiments, the number of accounts created over a time period may indicate a possible scalable attack. For example, the system 300 may determine the first number activities 302 and 304, and the second number of activities 308 and 310, over the time period indicates a number of accounts created over the time period, such as the last month of the activities 302, 304, 308, and/or 310, and possibly the other activities 318, 320, 334, 340, and/or 350. For example, the system 300 may determine the number of accounts created is an abnormal number (e.g., above a certain threshold and/or an average number) of accounts created in the time period, as described above in the scenarios above involving the number of accounts created in Santa Cruz, Calif. In some instances, the system 300 may determine one or more probabilities associated with the number of accounts created over the time period is below a threshold probability. As such, the system 300 may predict the scalable attack based on the one or more probabilities below the threshold probability.

Figure 4:
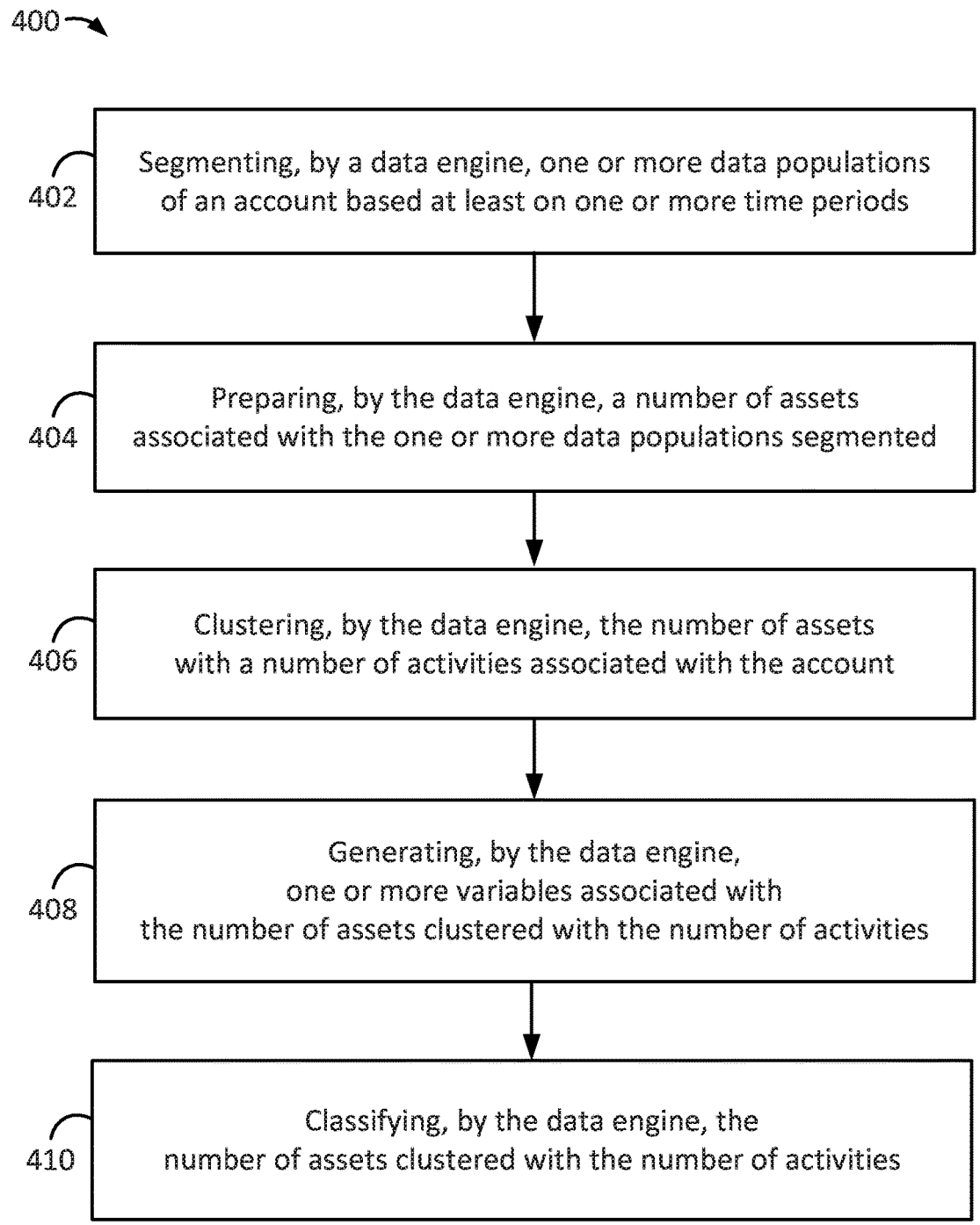
FIG. 4 illustrates an exemplary method, according to an embodiment.

FIG. 4 illustrates an exemplary method 400, according to an embodiment. The method 400 may be performed with the data engine 102 described above in relation to FIG. 1A, among various other types of systems and/or system components as well. Notably, one or more steps of the method 400 described herein may be omitted, performed in a different sequence, and/or combined with other methods for various types of applications contemplated herein.

At step 402, the method 400 may include segmenting, by a data engine, one or more data populations of an account based at least on one or more time periods. For example, considering the scenarios described above in relation to FIG. 1, one or more data populations 116 may be segmented based on the one or more time periods. As noted, the time periods may be based on the past week of activity associated with the account, the last month of activity associated with the account, and/or the last few months of activity associated with the account, among other possibilities.

In some embodiments, the data populations 116 may be segmented based on the time periods and filtered based on keys, such as the keys 218 and 220 described above in relation to FIGS. 2A-2C. By segmenting based on time periods and avoiding larger data populations, more accurate results may be obtained. Yet, the results may depend on the time periods selected based on the data population and filtering based on the keys 218 and 220 appropriately.

At step 404, the method 400 may include preparing, by the data engine, a number of assets associated with the one or more data populations segmented. For example, referring back to FIGS. 2A-2C, the method 400 may include preparing the assets 206 and 212, possibly including hard assets, soft assets, and/or behavior assets, among other possible types of assets. In some instances, processes may be implemented for each of the assets 206 and/or 212, where each asset 206 and/or 212 may be specified by the keys 218 and 220, respectively. Further, each key 218 and 220 may correspond with accounts, sessions, and/or transactions, among other types of possible assets. Further, assets 206 and 212 may be prepared with respective weights, as described above.

At step 406, the method 400 may include clustering, by the data engine, the number of assets with a number of activities associated with the account. In some instances, the assets 206 and 212 with the same or similar keys 218 and/or 220, respectively, may be clustered. In some instances, referring back to FIGS. 3A-3C, the clusters may operate as anomaly detection mechanisms. In particular, the clusters 301, 303, and/or 305 may identify irregularities and low probabilities of activities, such as the activities 302, 304, 308, and/or 310, possibly including various activities associated with a user account. In particular, density-based algorithms may be utilized to identify the irregularities and/or the low probabilities.

In some instances, the clustering involves consideration of the weights 307 and 313 of the assets 306 and 312, respectively. Further, the weights 307 and 313 may be tuned based on the number of other assets, such as the asset 322 and the respective weight 323 of the asset 322, as described above in relation to FIG. 3B. In some instances, the clustering may allow fuzzy matching, such that similar assets 306 and 322, possibly not identical assets, may be considered with different weights 307 and 323, respectively.

At step 408, the method 400 may include generating, by the data engine, one or more variables associated with the number of assets clustered with the plurality of activities. In particular, one or more variables may be generated for each cluster, such as the clusters 301, 303, and/or 305. In some instances, one variable for a given cluster 301, 303, and/or 305 may be associated with a family of data that indicates the architectures of the clusters 301, 303, and/or 305, an average weight of the assets 306, 312, 322, 336, 342, and/or 352 in the clusters 301, 303, and/or 305, the type of assets 306, 312, 322, 336, 342, and/or 352, and/or the asset consistency associated with the clusters 301, 303, and/or 305, among other aspects of the clusters 301, 303, and/or 305.

In some embodiments, the family of data may indicate the assets 306, 312, 322, 336, 342, and/or 352 and/or the asset links 314, 316, 324, 326, 344, 346, 354, and/or 356 from the one or more clustering stages, possibly indicating connections between accounts, such as transactions in the clusters 301, 303, and/or 305. In some instances, the data may also indicate a risk indicator and/or a status indicator, e.g., a good indication or a bad indication, possibly based each asset key. For example, the indicators may provide a risk indicator and/or a status indicator for each asset key, possibly associated with a respective account. In some instances, the risk indicator may be further expanded to other aspects of the clusters 301, 303, and/or 305, such as the on one or more activities 302, 304, 308, 310, 318, 320, 334, 340, and/or 350 in that may be tagged with a status, such as good or bad. As such, the risk indicator can reflect this tag or indicator on the clusters 301, 303, and/or 305.

At step 408, the method 400 may include classifying, by the data engine, the number of assets clustered with the number of activities. In some embodiments, various classification algorithm systems may be utilized to classify the clusters 301, 303, and/or 305. For example, support vector networks (SVNs), support vector machines (SVMs), and/or neural networks, among other types of machine learning systems may be utilized to determine the classification or the status of each cluster 301, 303, and/or 305, possibly indicating the cluster is good or bad. In some instances, multiple approaches to the classification may be performed. For example, one approach may involve classifying the given cluster 301, 303, and/or 305 based on the respective tags created for the cluster 301, 303, and/or 305. In some instances, another approach may involve training the cluster 301, 303, and/or 305 to model and/or predict the clusters 301, 303, and/or 305 as good or bad.

In some embodiment, referring back to FIGS. 2A-2C, each of the number of assets 206 and/or 212 is associated with the respective asset keys 218 and/or 220. As such, the method 400 may further include filtering one or more assets, such as the asset 212, from the number of assets 206, 212, and/or other assets, possibly based on the one or more assets 212 associated with an irrelevant key 220. As such, the number of assets 206 is prepared without the one or more assets 212.

In some embodiments, the method 400 includes determining respective weights. For example, the respective weights 307, 313, and/or 323 associated with the number of assets 306, 312, and/or 322 may be determined, as described above in relation to FIGS. 3A-3C. As such, the number of assets 306, 312, and/or 322 may be clustered based on the respective weights 307, 313, and/or 323 associated with the number of assets 306, 312, and/or 322. Further, the method 400 may include generating data, such as the family of data described above, that indicates an average weight of the respective weights 307, 313, and/or 323.

In some embodiments, the method 400 includes determining one or more matching assets, such as the assets 306 and 336 in FIG. 3C. For example, the assets 306 and 336 may match from amongst the number of assets 306, 312, 322, 336, 342, and/or 352 prepared. Further, the assets 322 and 352 may match from amongst the number of assets 306, 312, 322, 336, 342, and/or 352 prepared. Yet further, the method 400 may include determining the respective weights 307, 313, 323, 337, 343, and/or 353 associated with each of the number of assets 306, 312, 322, 336, 342, and/or 352, possibly based on the one or more matching assets 306 and 336 determined. For example, the matching assets 306 and/or 336 may include the higher weights 307 and/or 337, respectively, possibly such that the other respective weights 313, 323, 343, and/or 353 may be determined, such as scaled and/or measured accordingly. As such, the number of assets 306, 312, 322, 336, 342, and/or 352 may be clustered based on the one or more matching assets 306 and 336 determined from the number of assets 306, 312, 322, 336, 342, and/or 352 prepared and the respective weights 307, 313, 323, 337, 343, and/or 353 associated with the number of assets 306, 312, 322, 336, 342, and/or 352.

In some embodiments, the one or more matching assets 306 and 336 described above may be one or more similar assets 306 and 336 from amongst the number of assets 306, 312, 322, 336, 342, and/or 352 prepared. Further, the assets 322 and 352 may be similar from amongst the number of assets 306, 312, 322, 336, 342, and/or 352 prepared. Thus, the number of assets 306, 312, 322, 336, 342, and/or 352 may be clustered based on the one or more similar assets 306 and 336 determined from the number of assets 306, 312, 322, 336, 342, and/or 352. For example, the similar assets 306 and 336 may be clustered and/or structured together, and thus, the number of other assets 312, 336, 342, and/or 352 may be clustered accordingly.

In some embodiments, the one or more variables generated may indicate the architectures of the clusters, such as the architectures of the clusters 301, 303, and/or 305. For example, in some instances, the variables generated may indicate a cluster architecture associated with the number of assets 306, 312, 322, 336, 342, and/or 352 clustered. Further, the cluster architecture may indicate an average weight associated with the number of assets 306, 312, 322, 336, 342, and/or 352 clustered. In some embodiments, various inputs may be further considered. As such, one or more accounts associated with the clusters 301, 303, and/or 305 may indicate a bad or a suspect indication, which may indicate that one or more networks may behave in one or more bad ways as described herein.

In some embodiments, the method 400 may include training one or more models of the data engine 102 based on the classification of the number of assets 306, 312, 322, 336, 342, and/or 352 clustered with the number of activities 302, 304, 308, 310, 318, 320, 334, 340, and/or 350. Further, the training may optimize various processes associated with the one or more segmented data populations, the number of assets clustered (as noted above), and the respective weights associated with each of the assets clustered. Further, the method 400 includes modifying and/or optimizing the classification of the number of assets 306, 312, 322, 336, 342, and/or 352 clustered with the number of activities 302, 304, 308, 310, 318, 320, 334, 340, and/or 350 based on the one or more models trained.

In some embodiments, referring back to FIG. 3B, the method 400 may include determining the first asset 306 from a number of assets 306, 312, and/or 322. Further, the method 400 may include determining the second asset 322 from the number of assets 306, 312, and/or 322. In some instances, the second asset 322 may be dependent on the first asset 306. As such, the method 400 may further include determining one or more weights 307 and/or 323 associated with the first asset 306 and the second asset 322 based on the second asset 322 dependent on the first asset 306.

For example, the first asset 306 may indicate a zip code associated with the number of activities 302 and/or 304. Further, the second dependent asset 322 may indicate a city associated with the number of activities 318 and/or 320. As such, the method 400 may include determining whether one or more matches are associated with the zip code and the city. Further, the method 400 may include determining one or more weights 307 and/or 323 associated with the first asset 306 and/or the second dependent asset 322, possibly based at least on the one or more matches. For instance, the method 400 may determine one or more matches based on the zip code encompassing, overlapping, and/or being within thirty miles of the city, for purposes of illustration. As such, one or more higher weights 307 and/or 323 may be determined. Yet, the method 400 may determine that there are no matches based on the zip code and the city. As such, one or more lower weights, e.g., the weight 313, may be determined accordingly.

Figure 5:
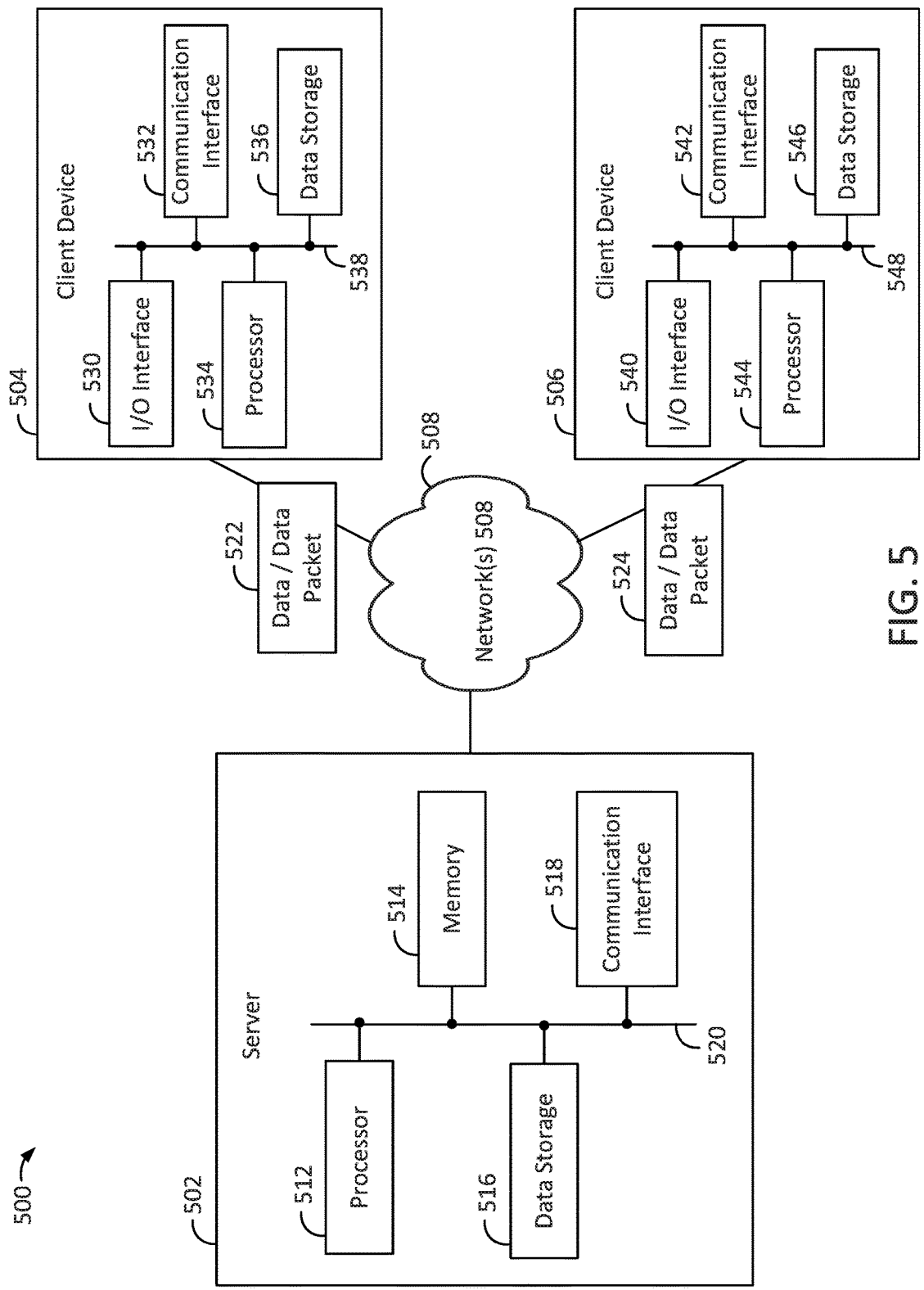
FIG. 5 is a simplified block diagram of an exemplary system, according to an embodiment.

FIG. 5 is a simplified block diagram of an exemplary system 500, according to an embodiment. The system 500 may include aspects of the system 100 described above in relation to FIG. 1, such as the data engine 102. Further, as shown in FIG. 5, the system 500 includes the server 502. The server 502 may include aspects of the data engine 102, such that the server 502 also includes the segmentation component 104, the asset preparation component 106, the clustering component 108, the variable generation component 110, and/or the classification component 112 described above. The system 500 may be configured to perform operations of a service provider, such as PayPal, Inc. of San Jose, Calif., USA. Further, the system 500 may also include client device 504 and the client device 506. As such, the server 502 and the client devices 504 and 506 may be configured to communicate over the one or more communication networks 508. As shown, the system 500 includes multiple computing devices 502, 504, and/or 506. Yet, the system 500 may also include other possible computing devices as well.

The system 500 may operate with more or less than the computing devices shown in FIG. 5, where each device may be configured to communicate over the one or more communication networks 508, possibly to transfer data accordingly. In some instances, the one or more communication networks 508 may include a data network, a telecommunications network, such as a cellular network, among other possible networks. In some instances, the communication network 508 may include web servers, network adapters, switches, routers, network nodes, base stations, microcells, and/or various buffers/queues to transfer data/data packets 522 and/or 524.

The data/data packets 522 and/or 524 may include the various forms of data associated with the one or more entities described above. The data/data packets 522 and/or 524 may be transferrable using communication protocols such as packet layer protocols, packet ensemble layer protocols, and/or network layer protocols, among other protocols and/or communication practices. For example, the data/data packets 522 and/or 524 may be transferrable using transmission control protocols and/or internet protocols (TCP/IP). In various embodiments, each of the data/data packets 522 and 524 may be assembled or disassembled into larger or smaller packets of varying sizes, such as sizes from 5,000 to 5,500 bytes, for example, among other possible data sizes. As such, data/data packets 522 and/or 524 may be transferrable over the one or more networks 508 and to various locations in the data infrastructure 500.

In some embodiments, the server 502 may take a variety of forms. The server 502 may be an enterprise server, possibly operable with one or more operating systems to facilitate the scalability of the data infrastructure 500. For example, the server 502 may operate with a Unix-based operating system configured to integrate with a growing number of other servers, client devices 504 and/or 506, and other networks 508 over the system architecture 500. The server 502 may further facilitate workloads associated with numerous assets and/or activities to identify possible attacks and/or attack trends. In particular, the server 502 may facilitate server scalability relative to such increasing numbers of assets and/or activities to eliminate data congestion, bottlenecks, and/or transfer delays associated with identifying the possible attacks and/or attack trends.

In some embodiments, the server 502 may include multiple components, such as one or more hardware processors 512, non-transitory memories 514, non-transitory data storages 516, and/or communication interfaces 518, among other possible components described above in FIG. 1, any of which may be communicatively linked via a system bus, network, or other connection mechanism 520. The one or more hardware processors 512 may take the form of a multi-purpose processor, a microprocessor, a special purpose processor, a digital signal processor (DSP) and/or other types of processing components. For example, the one or more hardware processors 512 may include an application specific integrated circuit (ASIC), a programmable system-on-chip (SOC), and/or a field-programmable gate array (FPGA). In particular, the one or more hardware processors 512 may include a variable-bit (e.g., 64-bit) processor architecture configured for generating one or more results with the neural networks described above. As such, the one or more hardware processors 512 may execute varying instructions sets (e.g., simplified and complex instructions sets) with fewer cycles per instruction than other general-purpose hardware processors to improve the performance of the server 502.

In practice, for example, the one or more hardware processors 512 may be configured to read instructions from the non-transitory memory component 514 to cause the system 500 to perform specific operations. The operations may be performed by the system 500, possibly with the data engine 102 described above in relation to FIG. 1. As such, the operations may include determining a first asset of a network associated with a first number of activities of one or more accounts. Further, the operations may include determining a second asset of the network associated with a second number of activities of the one or more accounts. Yet further, the operations may include determining one or more links associated with the first asset and the second asset. As such, the operations may include detecting an attack trend associated with the one or more accounts based on the one or more links with the first asset and the second asset. In addition, the operations may include generating a notification that indicates the attack trend detected.

Notably, the system 500 and/or the server 502 may be used to calculate the various risks and/or risk indicators described herein. Yet, various operations described herein should not be interpreted as being limited to being performed by the server 502, as various client devices 504 and/or 506 may also be configured to calculate such risks. Further, it should be noted that multiple servers, possibly those that take the form of the server 502, may also be implemented to carry out the operations described herein, such as calculating the risks and/or risk indicators. Yet further, it should be understood that the system 500 may operate in real time possibly based on the occurrences of one or more events, possibly events related to the examples of scalable fraud described above. In addition, the system 500 may also operate offline based on analyzing stored data, potentially with the system 500 being disconnected from the one or more networks 508.

The non-transitory memory component 514 and/or the non-transitory data storage 516 may include one or more volatile, non-volatile, and/or replaceable storage components, such as magnetic, optical, and/or flash storage that may be integrated in whole or in part with the one or more hardware processors 512. Further, the memory component 514 may include or take the form of a non-transitory computer-readable storage medium, having stored thereon computer-readable instructions that, when executed by the hardware processing component 512, cause the server 502 to perform operations described above and also those described in this disclosure, illustrated by the accompanying figures, and/or otherwise contemplated herein.

The communication interface component 518 may take a variety of forms and may be configured to allow the server 502 to communicate with one or more devices, such as the client devices 504 and/or 506. For example, the communication interface 518 may include a transceiver that enables the server 502 to communicate with the client devices 504 and/or 506 via the one or more communication networks 508. Further, the communication interface 518 may include a wired interface, such as an Ethernet interface, to communicate with the client devices 504 and/or 506.

Yet further, the communication interface 518 may include a wireless interface, a cellular interface, a Global System for Mobile Communications (GSM) interface, a Code Division Multiple Access (CDMA) interface, and/or a Time Division Multiple Access (TDMA) interface, among other types of cellular interfaces. In addition, the communication interface 518 may include a wireless local area network interface such as a WI-FI interface configured to communicate with a number of different protocols. As such, the communication interface 518 may include a wireless interface operable to transfer data over short distances utilizing short-wavelength radio waves in approximately the 2.4 to 2.485 GHz range. In some instances, the communication interface 518 may send/receive data or data packets 522 and/or 524 to/from client devices 504 and/or 506.

The client devices 504 and 506 may also be configured to perform a variety of operations such as those described in this disclosure, illustrated by the accompanying figures, and/or otherwise contemplated herein. In particular, the client devices 504 and 506 may be configured to transfer data/data packets 522 and/or 524 with the server 502, that include data associated with one or more entities. The data/data packets 522 and/or 524 may also include location data such as Global Positioning System (GPS) data or GPS coordinate data, triangulation data, beacon data, WI-FI data, sensor data, movement data, temperature data, asset link data, asset data, activity data, cluster data, the family of data described above, and/or other types of data described or contemplated herein.

In some embodiments, the client devices 504 and 506 may include or take the form of a smartphone system, a personal computer (PC) such as a laptop device, a tablet computer device, a wearable computer device, a head-mountable display (HMD) device, a smart watch device, and/or other types of computing devices configured to transfer data. The client devices 504 and 506 may include various components, including, for example, input/output (I/O) interfaces 530 and 540, communication interfaces 532 and 542, hardware processors 534 and 544, and non-transitory data storages 536 and 546, respectively, all of which may be communicatively linked with each other via a system bus, network, or other connection mechanisms 538 and 548, respectively.

The I/O interfaces 530 and 540 may be configured to receive inputs from and provide outputs to one or more entities, e.g., users, of the client devices 504 and 506. For example, the I/O interface 530 may include a display that renders a graphical user interface (GUI) configured to receive an input that indicates an entity request, e.g., a user request, to determine an assessment score. Thus, the I/O interfaces 530 and 540 may include displays and/or other input hardware with tangible surfaces such as touchscreens with touch sensitive sensors and/or proximity sensors. The I/O interfaces 530 and 540 may also be synched with a microphone configured to receive voice commands, a computer mouse, a keyboard, and/or other input mechanisms. In addition, I/O interfaces 530 and 540 may include output hardware, such as one or more touchscreen displays, sound speakers, other audio output mechanisms, haptic feedback systems, and/or other hardware components.

In some embodiments, communication interfaces 532 and 542 may include or take a variety of forms. For example, communication interfaces 532 and 542 may be configured to allow client devices 504 and 506, respectively, to communicate with one or more devices according to a number of protocols described or contemplated herein. For instance, communication interfaces 532 and 542 may be configured to allow client devices 504 and 506, respectively, to communicate with the server 502 via the communication network 508. The processors 534 and 544 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components.

The data storages 536 and 546 may include one or more volatile, non-volatile, removable, and/or non-removable storage components, and may be integrated in whole or in part with processors 534 and 544, respectively. Further, data storages 536 and 546 may include or take the form of non-transitory computer-readable mediums, having stored thereon instructions that, when executed by processors 534 and 544, cause the client devices 504 and 506 to perform operations, respectively, such as those described in this disclosure, illustrated by the accompanying figures, and/or otherwise contemplated herein.

In some embodiments, the one or more communication networks 508 may be used to transfer data between the server 502, the client device 504, the client device 506, and/or other computing devices associated with the data infrastructure 500. The one or more communication networks 508 may include a packet-switched network configured to provide digital networking communications and/or exchange data of various forms, content, type, and/or structure. The communication network 508 may include a data network such as a private network, a local area network, and/or a wide area network. Further, the communication network 508 may include a cellular network with one or more base stations and/or cellular networks of various sizes.

In some embodiments, the client device 504 may generate a request to identify possible attacks or attack trends. For example, the request may be encoded in the data/data packet 522 to establish a connection with the server 502. As such, the request may initiate a search of an internet protocol (IP) address of the server 502 that may take the form of the IP address, "192.168.1.102," for example. In some instances, an intermediate server, e.g., a domain name server (DNS) and/or a web server, possibly in the one or more networks 508 may identify the IP address of the server 502 to establish the connection between the client device 504 and the server 502. As such, the server 502 may generate a notification that indicates the attack trend detected, possibly transmitting the notification to the client device 504 to cause the client device 504 to display the notification.

It can be appreciated that the server 502 and the client devices 504 and/or 506 may be deployed in various other ways. For example, the operations performed by the server 502 and/or the client devices 504 and 506 may be performed by a greater or a fewer number of devices. Further, the operations performed by two or more of the devices 502, 504, and/or 506 may be combined and performed by a single device. Yet further, the operations performed by a single device may be separated or distributed among the server 502 and the client devices 504 and/or 506. In addition, it should be noted that the client devices 504 and/or 506 may be operated and/or maintained by the same entities, e.g., users. Yet further, the client devices 504 and/or 506 may be operated and/or maintained by different entities such that each client device 504 and/or 506 may be associated with one or more accounts. Notably, one or more accounts may be displayed on the client device 504, possibly through I/O interface 530. Thus, the account may be displayed on a smartphone system and/or any of the devices described or contemplated herein to access the account. For example, an entity, e.g., a user, may manage one or more of their accounts on the client device 504.

Figure 6A:
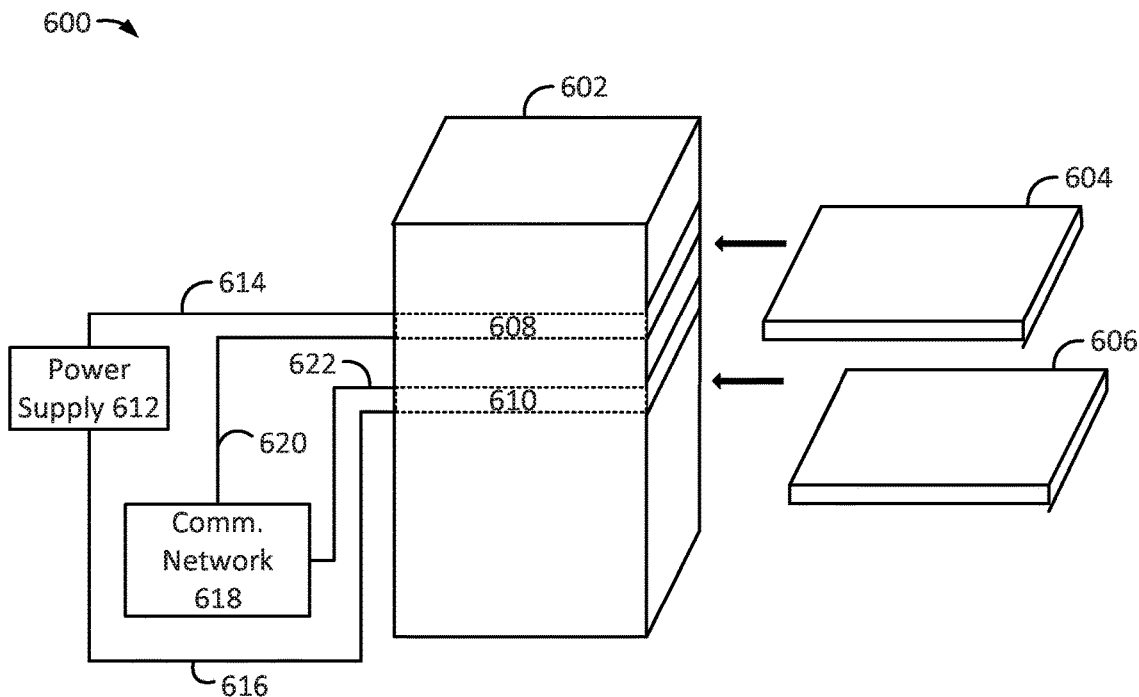
FIG. 6A illustrates an exemplary system configured to support a set of trays, according to an embodiment.

FIG. 6A illustrates exemplary system 600 configured to support a set of trays 604 and 606, according to an embodiment. The system 600 may, for example, include or take the form of the server 502 described above in relation to FIG. 5, possibly including the data engine 102 described in relation to FIG. 1. In particular, the system 600 may also be referred to as the server or server system 600. As such, the server system 600 may receive requests from numerous client devices, such as the client devices 504 and/or 506, to detect a number of attacks, scalable attacks, and/or attack trends. The system 600 may further support, operate, run, and/or manage the applications, websites, platforms, and/or other compilations of data to detect the attacks and/or attack trends.

As shown, the system 600 may include a chassis 602 that may support trays 604 and 606, possibly also referred to as servers or server trays 604 and/or 606. Notably, the chassis 602 may support multiple other trays as well. The chassis 602 may include slots 608 and 610, among other possible slots, configured to hold or support trays 604 and 606, respectively. For example, the tray 604 may be inserted into the slot 608 and the tray 606 may be inserted into the slot 610. Yet, the slots 608 and 610 may be configured to hold the trays 604 and 606 interchangeably such that the slot 608 may be configured to hold the tray 606 and the slot 610 may be configured to hold the tray 604.

Further, the chassis 602 may be connected to a power supply 612 via connections 614 and 616 to provide power to the slots 608 and 610, respectively. The chassis 602 may also be connected to the communication network 618 via connections 620 and 622 to provide network connectivity to the slots 608 and 610, respectively. As such, trays 604 and 606 may be inserted into slots 608 and 610, respectively, and power supply 612 may supply power to trays 604 and 606 via connections 614 and 616, respectively. Further, trays 604 and 606 may be inserted into the slots 610 and 608, respectively, and power supply 612 may supply power to trays 604 and 606 via connections 616 and 614, respectively.

Yet further, trays 604 and 606 may be inserted into slots 608 and 610, respectively, and communication network 618 may provide network connectivity to trays 604 and 606 via connections 620 and 622, respectively. In addition, trays 604 and 606 may be inserted into slots 610 and 608, respectively, and communication network 618 may provide network connectivity to trays 604 and 606 via connections 622 and 620, respectively. The communication network 618 may, for example, take the form of the one or more communication networks 508, possibly including one or more of a data network and a cellular network. In some embodiments, the communication network 618 may provide a network port, a hub, a switch, or a router that may be connected to an Ethernet link, an optical communication link, a telephone link, among other possibilities.

In practice, the tray 604 may be inserted into the slot 608 and the tray 606 may be inserted into the slot 610. During operation, the trays 604 and 606 may be removed from the slots 608 and 610, respectively. Further, the tray 604 may be inserted into the slot 610 and the tray 606 may be inserted into the slot 608, and the system 600 may continue operating, possibly based on various data buffering mechanisms of the system 600. Thus, the capabilities of the trays 604 and 606 may facilitate uptime and the availability of the system 600 beyond that of traditional or general servers that are required to run without interruptions. As such, the server trays 604 and/or 606 facilitate fault-tolerant capabilities of the server system 600 to further extend times of operation. In some instances, the server trays 604 and/or 606 may include specialized hardware, such as hot-swappable hard drives, that may be replaced in the server trays 604 and/or 606 during operation. As such, the server trays 604 and/or 606 may reduce or eliminate interruptions to further increase uptime.

Figure 6B:
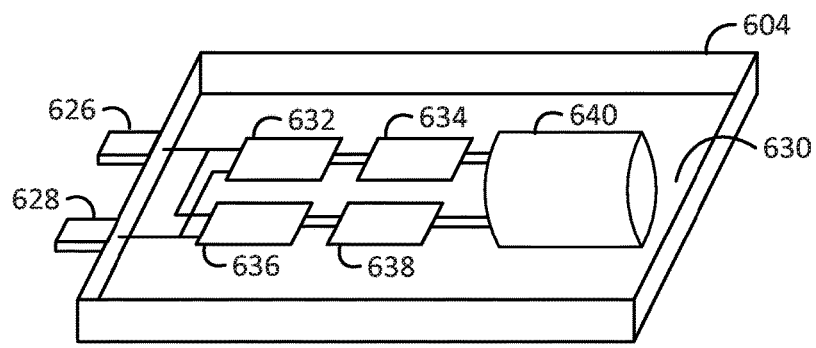
FIG. 6B illustrates an exemplary tray configured to support one or more components, according to an embodiment.

FIG. 6B illustrates an exemplary tray 604 configured to support one or more components, according to an embodiment. The tray 604, possibly also referred to as the server tray 604, may take the form of the tray 604 described in relation to FIG. 6A. Further, the tray 606 may also take the form of the tray 604. As shown, the tray 604 may include a tray base 630 that may include the bottom surface of the tray 604. The tray base 630 may be configured to support multiple components such as the hard drives described above and a main computing board connecting one or more components 632-640. The tray 604 may include a connection 626 that may link to the connections 614 or 616 to supply power to the tray 604. The tray 604 may also include a connection 628 that may link to the connections 620 or 622 to provide network connectivity to the tray 604. The connections 626 and 628 may be positioned on the tray 604 such that upon inserting the tray 604 into the slot 608, the connections 626 and 628 couple directly with the connections 614 and 620, respectively. Further, upon inserting the tray 604 into the slot 610, the connections 626 and 628 may couple directly with connections 616 and 622, respectively.

In some embodiments, the tray 604 may include a processor component 632, a memory component 634, a data storage component 636, a communication component and/or interface 638, that may, for example, take the form of the hardware processor 512, the non-transitory memory 514, the non-transitory data storage 516, and the communication interface 518, respectively. Further, the tray 604 may include the data engine component 640 that may take the form of the data engine 102. In particular, the data engine component 640 may include the segmentation component 104, the asset preparation component 106, the clustering component 108, the variable generation component 110, and/or the classification component 112.

As shown, the connections 626 and 628 may be configured to provide power and network connectivity, respectively, to each of the components 632-640. In some embodiments, one or more of the components 632-640 may perform operations described herein, illustrated by the accompanying figures, and/or otherwise contemplated. In some embodiments, the components 632-640 may execute instructions on a non-transitory, computer-readable medium to cause the system 600 to perform such operations.

As shown, the processor component 632 may take the form of a multi-purpose processor, a microprocessor, a special purpose processor, a digital signal processor (DSP). Yet further, the processor component 632 may take the form of an application specific integrated circuit (ASIC), a programmable system on chip (PSOC), field-programmable gate array (FPGA), and/or other types of processing components. For example, the processor component 632 may be configured to receive a request for an assessment score based on an input to a graphical user interface of a client device, such as the client device 504.

The data engine 640 may perform a number of operations. For example, the data engine 640 may determine a first asset 306 of a cluster 305 associated with a first number of activities 302 and 304 of the one or more accounts. Further, the data engine 640 may determine a second asset 312 of the cluster 305 associated with a second number of activities 308 and 310 of the one or more accounts. Yet further, the data engine 640 may determine a respective weight 307 and 313 for each of the first asset 306 and the second asset 312. In addition, the data engine 640 may predict a scalable attack associated with the one or more accounts based on the respective weights 307 and 313 determined. Further, the data engine 640 may generate a notification that indicates the scalable attack detected, possibly transmitting the notification to one or more client devices, such as the client devices 504 and/or 506.

In some embodiments, the processor component 632 may be configured with a Unix-based operating system, possibly to support scalability with various other servers and/or data infrastructures. In particular, the processor component 632 may be configured to be scalable with other servers of various forms that may, for example, include server trays, blades, and/or cartridges similar to the server trays 604 and/or 606. In some instances, the processor component 632 may be configured with scalable process architectures, including, reduced instruction set architectures. In some instances, the processor component 632 may be compatible with various legacy systems such that the processor component 632 may receive, read, and/or execute instruction sets with legacy formats and/or structures. As such, the processor component 632 generally has capabilities beyond that of traditional or general-purpose processors.

The database engine component 640 may also include one or more secure databases to track numerous assets and/or activities of accounts. For example, the database engine component 640 may include secured databases to detect the attacks and/or attack trends described herein. In particular, the database engine component 640 may perform searches based on numerous queries, search multiple databases in parallel, and detect the data simultaneously and/or consecutively. Thus, the database engine component 640 may relieve various bottlenecks encountered with traditional or general-purpose servers.

Any two or more of the components 632-640 described above may be combined. For example, two or more of the processor component 632, the memory component 634, the data storage component 636, the communication component and/or interface 638, and/or the data engine component 640 may be combined. Further, the combined component may take the form of one or more processors, DSPs, SOCs, FPGAs, and/or ASICs, among other types of processing devices and/or components described herein. For example, the combined component may take the form an SOC that integrates various other components in a single chip with digital, analog, and/or mixed-signal functions, all incorporated within the same substrate. As such, the SOC may be configured to carry out various operations of the components 632-640.

The components 632-640 described above may provide advantages over traditional or general-purpose servers and/or computers. For example, the components 632-640 may enable the system 600 to transfer data over the one or more communication networks 618 to numerous other client devices, such as the client devices 104 and/or 106. In particular, the components 632-640 may enable the system 600 to identify attacks and/or attack trends locally from a single server tray 604. In some instances, configuring a separate and/or dedicated processing component 632 to identify the attacks and/or attack trends may optimize operations beyond the capabilities of traditional servers including general-purpose processors. As such, the average wait time for the client device 104 to identify the attacks may be minimized to a fraction of a second.

It can be appreciated that the system 600, the chassis 602, the trays 604 and 606, the slots 608 and 610, the power supply 612, the communication network 618, and the components 632-640 may be deployed in other ways. The operations performed by components 632-640 may be combined or separated for a given embodiment and may be performed by a greater number or fewer number of components or devices. Further, one or more components or devices may be operated and/or maintained by the same or different entities.

Figure 7:
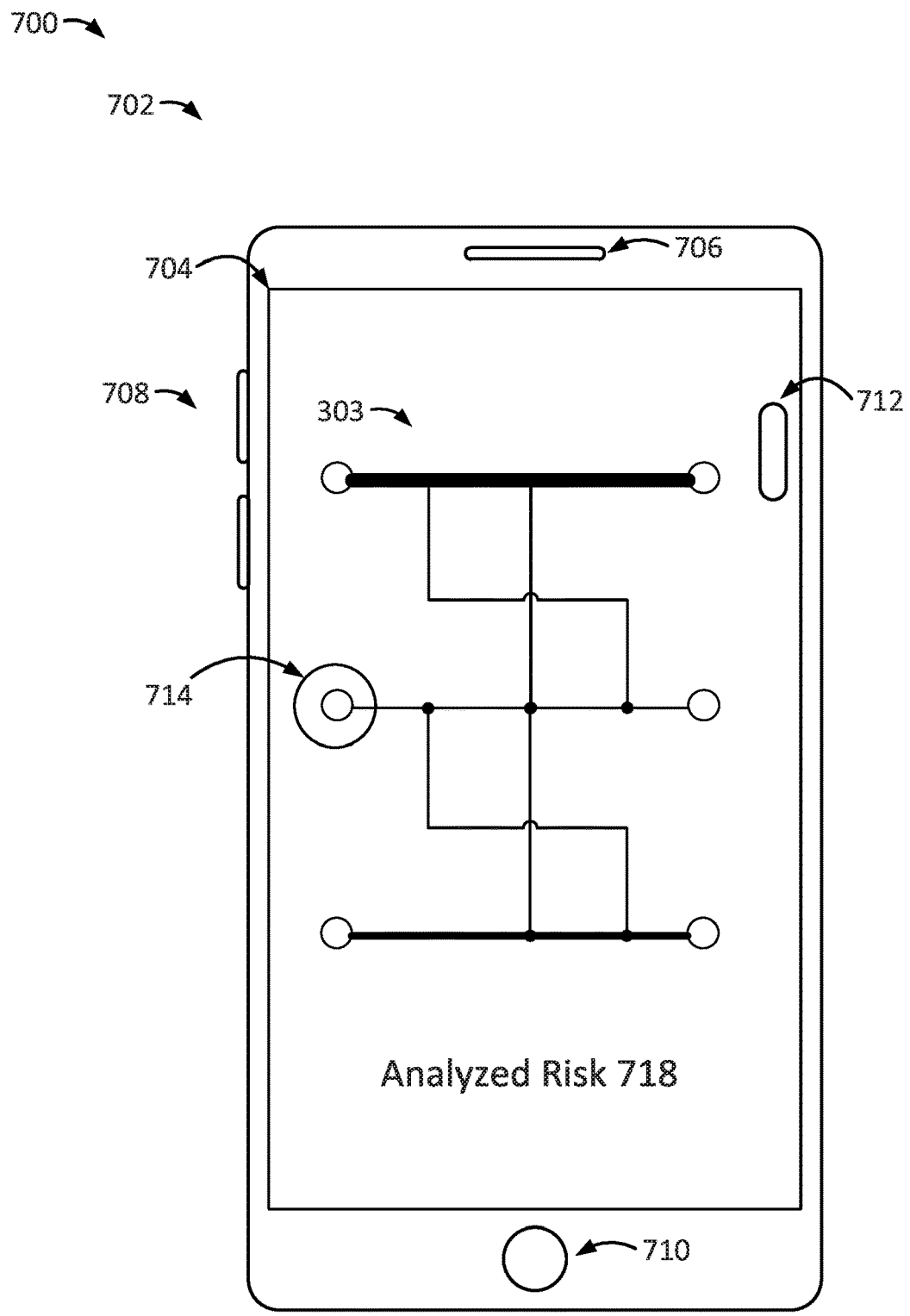
FIG. 7 illustrates an exemplary system with a client device, according to an embodiment.

FIG. 7 illustrates an exemplary system 700 with a client device 702, according to an embodiment. In some embodiments, the system 700, possibly referred to a smartphone system 700, may include aspects of the system 500 such that the client device 702 takes the form of the client device 504. As shown, the smartphone system 700 may include a display or an input/output (I/O) interface 704 that takes the form of the I/O interface 530 described above. The smartphone system 700 may also include a speaker/microphone 706, one or more side buttons 708, and a button 710 including a fingerprint sensor, among other possible hardware components. The smartphone system 700 may also include a non-transitory machine-readable medium having stored thereon machine-readable instructions executable to cause a machine, such as the smartphone system 700, to perform the operations described herein. The smartphone system 700 may also include one or more hardware processors that may take the form of the processor 534. The one or more hardware processors may be coupled to the non-transitory machine-readable medium, e.g., the data storage 536, and configured to read the instructions to cause the smartphone system 700 to perform operations.

As shown, the smartphone system 700 may display the cluster 303 with the I/O interface 704, as described above in relation to FIG. 3B. Further, the system 700 may display the assets 306, 312, and/or 322, the respective weights 307, 313, and/or 323, along with the activities 302, 304, 308, 310, 318, and/or 320. Yet further, the system 700 may display the asset links 314, 316, 324, and/or 326. In addition, the system 700 may display the notification 714, possibly received from the data engine 102, as described above. Notably, the notification 714 may indicate an activity, such as the activity 308, possibly related to an attack and/or an attack trend, as described above.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A system, comprising:
a non-transitory memory; and
one or more hardware processors coupled to the non-transitory memory and configured to read instructions from the non-transitory memory to cause the system to perform operations comprising:
  accessing electronic transaction activities segmented into a first plurality of electronic transaction activities and a second plurality of electronic transaction activities based on a time at which each of the electronic transaction activities was performed, wherein the first plurality of electronic transaction activities were performed within a first time period and the second plurality of electronic transaction activities were performed within a second time period;
  determining that a first electronic transaction activity and a second electronic transaction activity from the first plurality of electronic transaction activities share a first common attribute of a first attribute type;
  determining that a third electronic transaction activity and a fourth electronic transaction activity from the second plurality of electronic transaction activities share a second common attribute of a second attribute type different from the first attribute type;
  determining one or more relationships between the first common attribute and the second common attribute;

accessing a first weight, assigned to the first common attribute, representing a probability of the first common attribute being associated with the one or more user funding accounts;

accessing a second weight, assigned to the second common attribute, representing a probability of the second common attribute being associated with the one or more user funding accounts;

detecting an attack trend associated with the one or more user funding accounts based at least on the one or more relationships and a difference between the first weight and the second weight being larger than a predetermined threshold; and generating a notification that indicates the attack trend detected.

2. The system of claim 1, wherein the first common attribute comprises website data stored in a browser of a user device with access to the one or more user funding accounts, wherein the second common attribute comprises a network address associated with the user device, and wherein determining the one or more relationships comprises determining that the website data corresponds to the IP network address.

3. The system of claim 1, wherein the first common attribute comprises first data that indicates a network address associated with the first and second electronic transaction activities, wherein the second common attribute comprises second data that indicates a physical location associated with the third and fourth electronic transaction activities, and wherein determining the one or more relationships comprises determining that the network address is corresponds to the physical location.

4. The system of claim 1, wherein the operations further comprise:

detecting one or more repeated actions associated with the one or more user funding accounts performed within the second time period, wherein the attack trend is detected further based on the one or more repeated actions.

5. The system of claim 1, wherein the the first common attribute is clustered with the second common attribute based at least on the one or more relationships.

6. The system of claim 1, wherein the operations further comprise:

determining one or more expected tracks associated with the detected attack trend;

detecting an attempt to remove the one or more expected tracks during an attack; and generating a second notification indicating the detected attempt to remove the one or more expected tracks.

7. The system of claim 1, wherein the operations further comprise:

determining a probability of the first plurality of electronic transaction activities and the second plurality of electronic transaction activities comprising one or more fraudulent activities; and adjusting the first and second weights based at least on the probability.

8. The system of claim 1, wherein the operations further comprise:

determining a first frequency that electronic transaction activities associated with the first common attribute from the first plurality of electronic transaction activities are performed during the first time period; and determining a second frequency that electronic transaction activities associated with the second common attribute from the second plurality of electronic transaction activities are performed during the second time period, wherein the attack trend is detected further based on the first and second frequencies.

9. The system of claim 1, wherein the first plurality of electronic transaction activities and the second plurality of electronic transaction activities indicate a number of user funding accounts being created over the first and second time periods, wherein the operations further comprise:

determining that the number of user funding accounts being created over the first and second time periods is above an estimated number by a threshold, wherein the attack trend is detected further based on the probability being below the threshold probability.

10. A non-transitory machine-readable medium having stored thereon machine-readable instructions executable to cause a machine to perform operations comprising:

accessing electronic transaction activities segmented into a first plurality of electronic transaction activities and a second plurality of electronic transaction activities based on a time at which each of the electronic transaction activities was performed, wherein the first plurality of electronic transaction activities were performed within a first time period and the second plurality of electronic transaction activities were performed within a second time period;

determining that a first electronic transaction activity and a second electronic transaction activity from the first plurality of electronic transaction activities share a first common attribute of a first attribute type;

determining that a third electronic transaction activity and a fourth electronic transaction activity from the second plurality of electronic transaction activities share a second common attribute of a second attribute type different from the first attribute type;

accessing a first weight, assigned to the first common attribute, a indicating a probability that the first common attribute is associated with one or more funding accounts;

accessing a second weight, assigned to the second asset, indicating a probability that the second common attribute is associated with the one or more user funding accounts;

predicting a scalable attack associated with the one or more user funding accounts based at least on a difference between the first and second weights being larger than a predetermined threshold; and generating a notification that indicates the scalable attack detected.

11. The non-transitory machine-readable medium of claim 10, wherein the operations further comprise:

determining one or more expected tracks associated with the predicted scalable attack, wherein the one or more expected tracks are associated with at least one of the first common attribute or the second common attribute;

detecting an attempt to remove the one or more expected tracks during the scalable attack; and generating a second notification indicating the detected attempt to remove the one or more expected tracks.

12. The non-transitory machine-readable medium of claim 10, wherein the operations further comprise:

determining a probability of the first plurality of electronic transaction activities and the second plurality of electronic transaction activities comprising one or more fraudulent activities; and adjusting the first and second weights for the first and the second common attributes, respectively, based at least on the probability.

13. The non-transitory machine-readable medium of claim 10, wherein the scalable attack is predicted further based on the first weight being greater than the second weight.

14. The non-transitory machine-readable medium of claim 10, wherein the operations further comprise:

determining a first frequency that electronic transaction activities associated with the first common attribute from the first plurality of electronic transaction activities are performed during the first time period; and determining a second frequency that electronic transaction activities associated with the second common attribute from the second plurality of electronic transaction activities are performed during the second time period, wherein the scalable attack is predicted further based on the first and second frequencies.

15. The non-transitory machine-readable medium of claim 10, wherein the first plurality of electronic transaction activities and the second plurality of electronic transaction activities indicate a number of user funding accounts being created over the first and second time periods, wherein the operations further comprise:

determining that the number of user funding accounts being created over the first and second time periods is above a predetermined number by a threshold, wherein the scalable attack is predicted further based on the probability being below the threshold probability.

16. A method, comprising:

accessing, by a data engine, electronic transactions segmented into a first plurality of electronic transactions and a second plurality of electronic transactions based on a time at which each of the electronic transactions was performed, wherein the first plurality of electronic transactions were performed within a first time period and the second plurality of electronic transactions were performed within a second time period;

determining, by the data engine, that a first electronic transaction and a second electronic transaction from the first plurality of electronic transactions share a first common attribute;

determining, by the data engine, that a third electronic transaction and a fourth electronic transaction from the second plurality of electronic transactions share a second common attribute;

obtaining, by the data engine, a relationship between the first and second common attributes;

accessing a first weight, assigned to the first asset, representing a probability of the first asset being associated with an account;

a second weight, assigned to the second asset, representing a probability of the second asset being associated with the account;

determining, by the data engine, that a difference between the first weight and the second weight is larger than a predetermined threshold;

detecting, by the data engine, an attack trend associated with the account based at least on the relationship between the first and second common attributes and the determined difference being larger than the predetermined threshold; and generating, by the data engine, a notification that indicates the detected attack trend.

17. The method of claim 16, wherein the first and second common attributes are clustered based at least on the derived relationship.

18. The method of claim 17, further comprising generating one or more variables indicating a cluster architecture associated with the clustered first and second common attributes, wherein the one or more variables comprise a variable that indicates an average weight calculated based at least in part on the first and second weights.

19. The method of claim 17, wherein the method further comprises:

determining a classification of the clustered first and second common attributes;

training one or more models based at least on the classification of the clustered first and second common attributes and the first and second weights; and modifying the classification of the clustered first and second assets common attributes based at least on the one or more models.

20. The method of claim 16, wherein the second common attribute is dependent on the first common attribute; and wherein the first and second weights are assigned to the first common attribute and the second common attribute based at least on the second common attribute being dependent on the first common attribute.

21. The method of claim 16, wherein the first common attribute indicates a zip code associated with the first and second electronic transactions, wherein the second common attribute indicates a city associated with the third and fourth electronic transactions, and wherein deriving the relationship comprises:

determining whether the zip code corresponds to the city.

22. The method of claim 21, wherein the first and second weights are assigned to the first common attribute and the second common attribute based at least on the determining of whether the zip code corresponds to the city.

* * * * *

UNITED STATES PATENT AND TRADEMARK OFFICE
CERTIFICATE OF CORRECTION

PATENT NO. : 10,412,099 B2
APPLICATION NO. : 15/189500
DATED : September 10, 2019
INVENTOR(S) : Adam Cohen, David Stein and Itzik Levi Page 1 of 1

It is certified that error appears in the above-identified patent and that said Letters Patent is hereby corrected as shown below:

In the Claims

Column 25, Line 3, Claim 1 delete "the"

Column 25, Line 24, Claim 2 delete "IP"

Column 25, Line 44, Claim 5 delete "the"

Column 26, Line 43, Claim 10 delete "a indicating a" add "indicating a"

Column 28, Line 4, Claim 16 delete "a second weight" add "accessing a second weight"

Signed and Sealed this
Nineteenth Day of November, 2019

Andrei Iancu
*Director of the United States Patent and Trademark Office*